(12) United States Patent
Braun et al.

(10) Patent No.: US 8,237,538 B2
(45) Date of Patent: Aug. 7, 2012

(54) POROUS BATTERY ELECTRODE FOR A RECHARGEABLE BATTERY AND METHOD OF MAKING THE ELECTRODE

(75) Inventors: Paul V. Braun, Savoy, IL (US); Hui Gang Zhang, Shaanxi Province (CN); Xindi Yu, Shanghai (CN)

(73) Assignee: The Board of Trustees of the University of Illinois, Urbana, IL (US)

( * ) Notice: Subject to any disclaimer, the term of this patent is extended or adjusted under 35 U.S.C. 154(b) by 332 days.

(21) Appl. No.: 12/575,197

(22) Filed: Oct. 7, 2009

(65) Prior Publication Data
US 2010/0068623 A1    Mar. 18, 2010

Related U.S. Application Data

(63) Continuation-in-part of application No. 11/733,151, filed on Apr. 9, 2007, now Pat. No. 7,872,563.

(51) Int. Cl.
*H01C 7/10* (2006.01)

(52) U.S. Cl. ............ 338/20; 429/219; 429/209; 427/58; 427/126.4

(58) Field of Classification Search ............... 429/219, 429/209; 338/20; 205/640, 57; 427/58, 427/126.4
See application file for complete search history.

(56) References Cited

U.S. PATENT DOCUMENTS

| | | | | |
|---|---|---|---|---|
| 4,017,820 | A * | 4/1977 | Ross | 338/35 |
| 6,409,907 | B1 * | 6/2002 | Braun et al. | 205/317 |
| 6,541,539 | B1 * | 4/2003 | Yang et al. | 523/200 |
| 6,669,961 | B2 * | 12/2003 | Kim et al. | 424/489 |
| 6,680,013 | B1 | 1/2004 | Stein et al. | 264/44 |
| 2008/0246580 | A1 | 10/2008 | Braun et al. | 338/20 |

OTHER PUBLICATIONS

Arico, Antonino Salvatore et al., "*Nanostructured Materials for Advanced Energy Conversion and Storage Devices,*" Nature Materials 4, (2005) pp. 366-377.
Bing, Zhang et al., "*Electrochemical Characterization of a Three Dimensionally Ordered Macroporous Anatase $TiO_2$ Electrode,*" Electrochemical and Solid-State Letters 9, 3 (2006) pp. A101-A104.
Braun, Paul V., "*Electrochemical Fabrication of 3D Microperiodic Porous Materials,*" Advanced Materials, 13, 7 (2001) pp. 482-485.
Braun, Paul V., et al, "*Electrochemically Grown Photonic Crystals,*" Nature 402 (1999) pp. 603-604.
Chan, Candace K. et al., "*High-Performance Lithium Battery Anodes Using Silicon Nanowires,*" Nature Nanotechnology, 3 (2008) pp. 31-35.
Cheng, Fangyi, et al., "*Template-Directed Materials for Rechargeable Lithium-Ion Batteries,*" Chem. Mater. 20 (2008) pp. 667-681.

(Continued)

*Primary Examiner* — Kyung Lee
(74) *Attorney, Agent, or Firm* — Brinks Hofer Gilson & Lione

(57) ABSTRACT

A porous battery electrode for a rechargeable battery includes a monolithic porous structure having a porosity in the range of from about 74% to about 99% and comprising a conductive material. An active material layer is deposited on the monolithic porous structure. The pores of the monolithic porous structure have a size in the range of from about 0.2 micron to about 10 microns. A method of making the porous battery electrode is also described.

26 Claims, 15 Drawing Sheets

OTHER PUBLICATIONS

Chou, Shu-Lei, et al., "Electrochemical Deposition of Porous $Co(OH)_2$ Nanoflake Films on Stainless Steel Mesh for Flexible Supercapacitors," Journal of the Electrochemical Society, 155, 12, (2008) pp. A926-A929.

Eftekhari, Ali, "3D Deposition of $LiMn_2O_4$: Enhancement of Lithium Battery Performance," Solid State Ionics, 161 (2003) pp. 41-47.

Ergang, Nicholas S. et al., "Photonic Crystal Structures as a Basis for a Three-Dimensionally Interpenetrating Electrochemical-Cell System," Advanced Materials 18, (2006) pp. 1750-1753.

Ergang, Nicholas S. et al., "Effect of a Macropore Structure on Cycling Rates of $LiCoO_2$," Journal of The Electrochemical Society, 152, 10 (2005) pp. A1989-A1995.

Gutiérrez, Maria C., et al., "$PPO_{15}$-$PEO_{22}$-$PPO_{15}$-Block Copolymer Assisted Synthesis of Monolithic Macro- and Microporous Carbon Aerogels Exhibiting High Conductivity and Remarkable Capacitance," J. Mater. Chem., 19 (2009) pp. 1236-1240.

Huang, Junjie, et al., "The Synthesis of Hollow Spherical $Li_4Ti_5O_{12}$ by Macromulsion Method and its Application in Li-Ion Batteries," Electrochemical and Solid-State Letters, 11, 7 (2008) pp. A116-A118.

Jiang, Chunhai, et al., "Preparation and Rate Capability of $Li_4Ti_5O_{12}$ Hollow-Sphere Anode Material," Journal of Power Sources, 166 (2007) pp. 514-518.

Kudo, T. et al., "Amorphous $V_2O_5$/Carbon Composites as Electrochemical Supercapacitor Electrodes," Solid State Ionics, 152-153 (2002) pp. 833-841.

Lee, Kyu T. et al., "Synthesis and Rate Performance of Monolithic Macroporous Carbon Electrodes for Lithium-Ion Secondary Batteries," Advanced Functional Materials 15, 4 (2005) pp. 547-556.

Long, Jeffrey W. et al., "Three-Dimensional Battery Architectures," Chem. Rev. 104 (2004) pp. 4463-4492.

Lu, Junbiao, et al., "Preparation of $LiFePO_4$ with Inverse Opal Structure and its Satisfactory Electrochemical Properties," Materials Research Bulletin, 40 (2005) pp. 2039-2046.

Lytle, Justin C. et al., "Structural and Electrochemical Properties of Three-Dimensionally Ordered Macroporous Tin (iv) Oxide Films," J. Mater. Chem. 14 (2004) pp. 1616-1622.

Motupally, Sathya et al., "Proton Diffusion in Nickel Hydroxide" Prediction of Active Material Utilization, Journal of the Electrochemical Society 145, 1 (1998) pp. 29-34.

Nakano, Hiroyuki, et al., "Three-Dimensionally Ordered Composite Electrode Between $LiMn_2O_4$ and $Li_{1.5}Al_{0.5}Ti_{1.5}(PO_4)_3$," Ionics 14 (2008) pp. 173-177.

Rolison, Debra R., et al., "Multifunctional 3D Nanoarchitectures for Energy Storage and Conversion," Chem. Soc. Rev., 38 (2009) pp. 226-252.

Sakamoto, Jeffrey S. et al., "Hierarchical Battery Electrodes Based On Inverted Opal Structures," J. Mater. Chem., 12 (2002) pp. 2859-2861.

Simon, P. et al., "Materials for Electrochemical Capacitors," Nature Materials, 7 (2008) pp. 845-854.

Sorensen, Erin M. et al., "Three-Dimensionally Ordered Macroporous $Li_4Ti_5O_{12}$: Effect of Wall Structure on Electrochemical Properties," Chem. Mater. 18 (2006) pp. 482-489.

Stein, Andreas et al., "Functionalization of Porous Carbon Materials with Designed Pore Architecture," Advanced Materials 21, (2009) pp. 265-293.

Su, Fabing et al., "Synthesis of Graphitic Ordered Macroporous Carbon with a Three-Dimensional Interconnected Pore Structure for Electrochemical Applications," J. Phys. Chem. B 109, (2005) pp. 20200-20206.

Tabata, Seiichiro, et al., "Inverse Opal Carbons Derived from a Polymer Precursor as Electrode Materials for Electric Double-Layer Capacitors," Journal of The Electrochemical Society, 155, 3 (2008) pp. K42-K49.

Taberna P.L. et al., "High Rate Capabilities $Fe_3O_4$-Based Cu Nano-Architectured Electrodes for Lithium-Ion Battery Applications," Nature Materials 5, (2006) pp. 567-573.

Tonti, Dino, et al., "Three-Dimensionally Ordered Macroporous Lithium Manganese Oxide for Rechargeable Lithium Batteries," Chem. Mater. 20 (2008) pp. 4783-4790.

Wang, Zhiyong et al., "Porous Carbon/Tin (IV) Oxide Monoliths as Anodes for Lithium-Ion Batteries," Journal of the Electrochemical Society, 155, 9 (2008) pp. A658-A663.

Weidner John W. et al., "Effect of Proton Diffusion, Electron Conductivity, and Charge-Transfer Resistance on Nickel Hydroxide Discharge Curves," Journal of the Electrochemical Society, 141, 2 (1994) pp. 346-351.

Woo, Sang-Wook, et al., "Preparation and Characterization of Three Dimensionally Ordered Macroporous $Li_4Ti_5O_{12}$ Anode for Lithium Batteries," Electrochimica Acta 53 (2007) pp. 79-82.

Yan, Ongwei, et al., "Colloidal-Crystal-Templated Synthesis of Ordered Macroporous Electrode Materials for Lithium Secondary Batteries," Journal of the Electrochemical Society, 50 (2003) pp. A1102-1107.

Yang, Guang-Wu, et al., "Electrodeposited Nickel Hydroxide on Nickel Foam with Ultrahigh Capacitance," Chem. Commun. (2008) pp. 6537-6539.

Yao, Masaru et al., "Nickel Substrate Having Three-Dimensional Micronetwork Structure for High-Power Nickel/Metal-Hydride Battery," Electrochemical and Solid-State Letters, 10, 3 (2007) pp. A56-A59.

Yu, Xindi, et al., "Filling Fraction Dependent Properties of Inverse Opal Metallic Photonic Crystals," Advanced Materials, 19 (2007) pp. 1689-1692.

\* cited by examiner

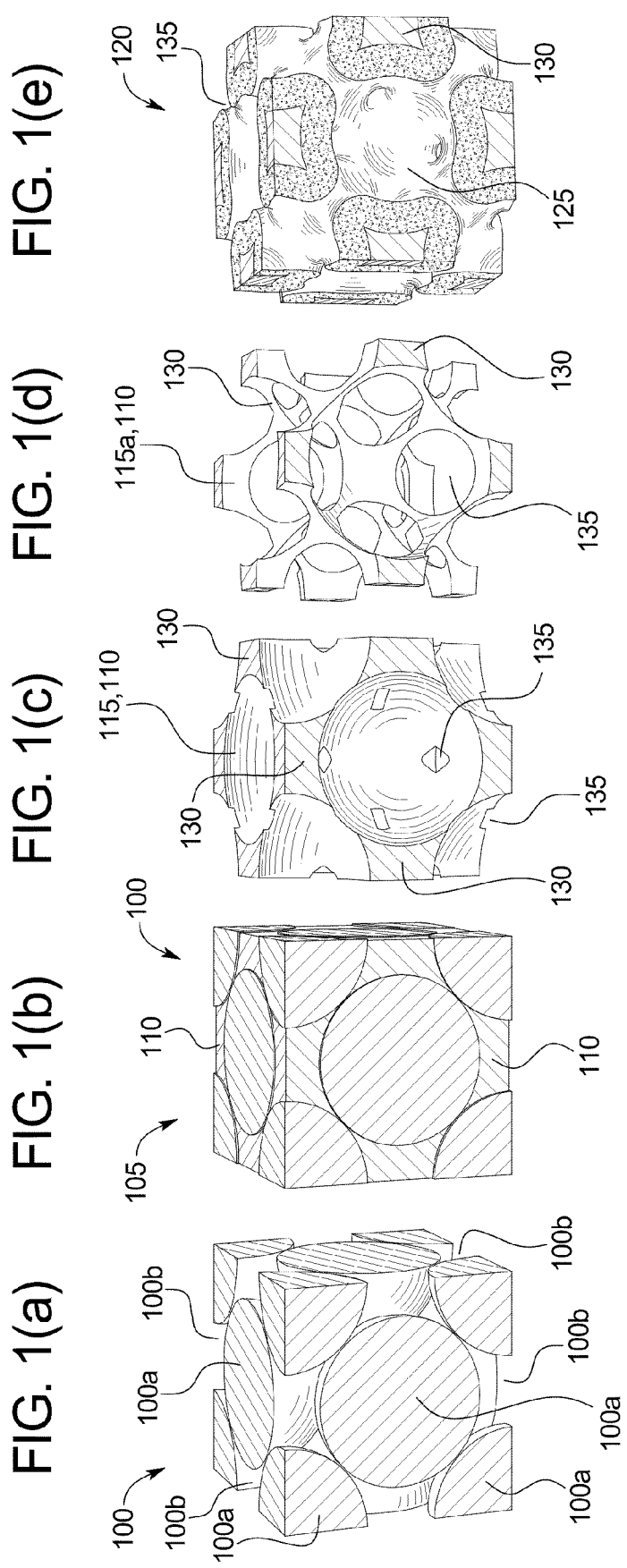

D: the spherical void diameter
a: the periodic spacing in FCC structure

FIG. 4(a)
FIG. 4(b)
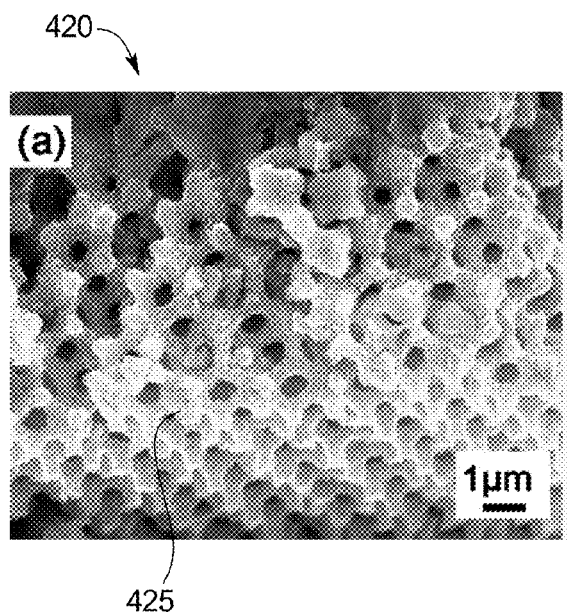
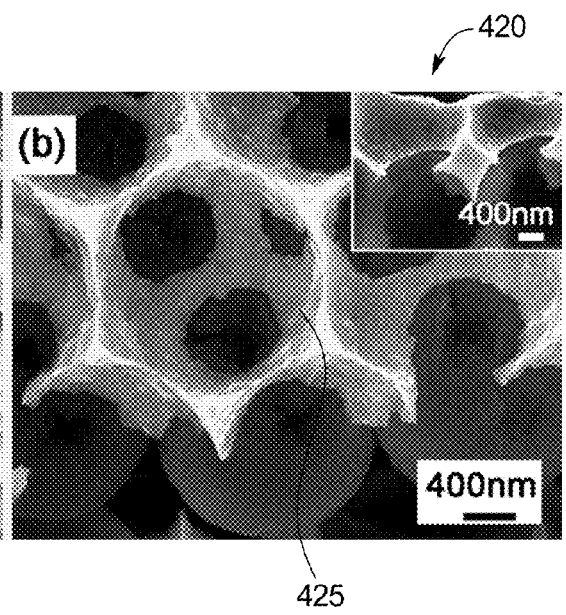

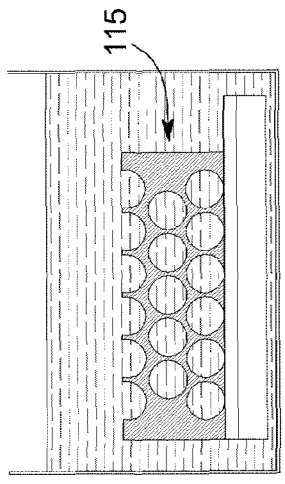
FIG. 5(a)
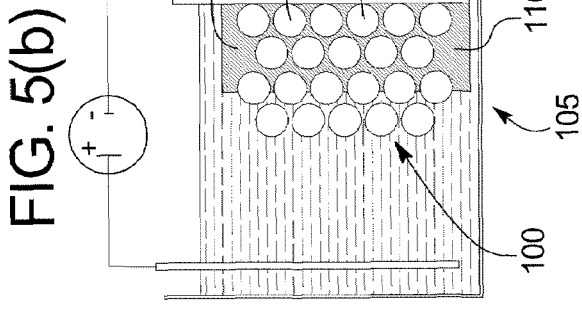
FIG. 5(b)
FIG. 5(c)
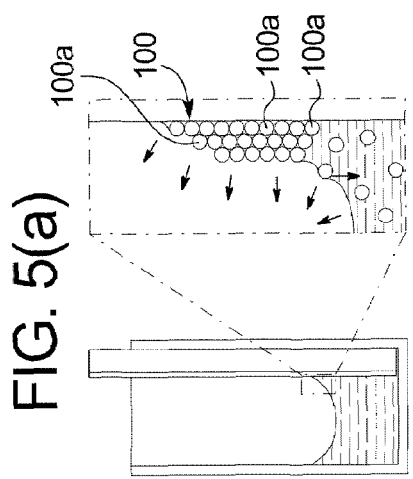
FIG. 5(d)
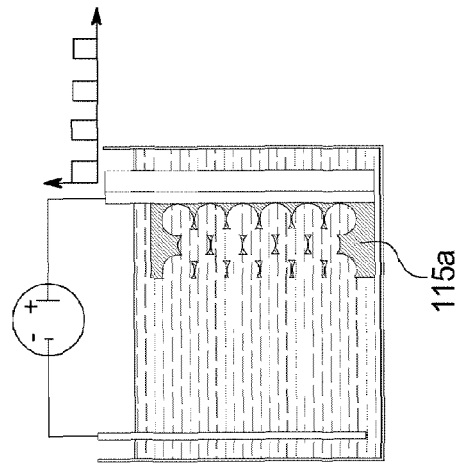
FIG. 5(e)
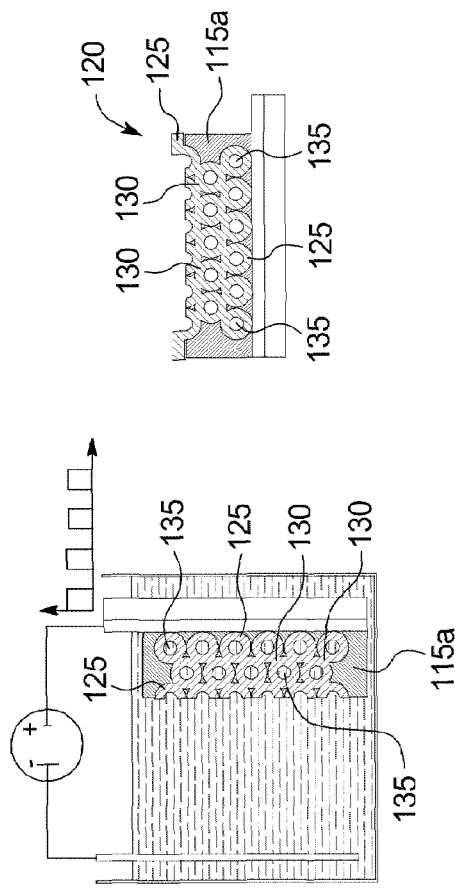

US 8,237,538 B2

POROUS BATTERY ELECTRODE FOR A RECHARGEABLE BATTERY AND METHOD OF MAKING THE ELECTRODE

RELATED APPLICATIONS

The present patent document is a continuation-in-part of U.S. patent application Ser. No. 11/733,151, which was filed on Apr. 9, 2007, and is hereby incorporated by reference in its entirety.

FEDERALLY SPONSORED RESEARCH OR DEVELOPMENT

This subject matter of this application may have been funded in part by the following research grants and contracts: Department of Energy (through the Frederick Seitz Material Research Laboratory) award no. DEFG02-91 ER45439 and the U.S. Army Research Office contract/grant no. DMD19-03-1-0227. The U.S. Government may have rights in this invention.

TECHNICAL FIELD

This disclosure is related generally to monolithic porous structures, and more particularly to porous battery electrodes.

BACKGROUND

Porous solids with tailored pore characteristics have attracted considerable attention because of their novel optical, catalytic, sensing, and electrochemical properties. Examples having a generally periodic pore structure include photonic crystals and photonic bandgap materials. Examples which may not require a periodic pore structure include separation membranes, mesoporous molecular sieves, and three-dimensionally (3D) porous metals. Porous metals in particular are widely used in energy conversion or storage devices, as filters, as catalyst supports, as electromagnetic wave absorbers, and as biomedical scaffold materials.

Porous conductive current collectors are used in commercially available rechargeable batteries, such as nickel metal hydride (NiMH) batteries. Most commercial NiMH battery cathodes employ sintered plaque or nickel foam as the current collectors. The performance of the nickel foam is limited, however, by large pore sizes and a broad pore size distribution. When the foam is impregnated with nickel hydroxide, the charge storage media, protons and electrons have to travel a long distance between the nickel metal and the $Ni(OH)_2$/electrolyte interface. Because the reduced state of the charge storage material is nearly an insulator, discharge becomes difficult due to increasing resistance along the ion and electron transfer paths. Thus, commercial batteries lose considerable capacity when discharged at a high C rate (nC rate is defined as the full use of the battery capacity in 1/n hour). For example, when discharged at a 35 C rate the capacity of a NiMH battery with a commercially available nickel foam is only 1.7% of its slow discharge capacity. Charge is the reverse process of discharge. However, due to the asymmetric characteristics, charge is more difficult than discharge at the same rate. Therefore, shortened ion/electron pathways may have a significant effect on improving the charging capability of batteries.

BRIEF SUMMARY

A highly porous current collector (HPCC) designed to have exceptionally short electron and ion transfer paths, and a method of making a HPCC-based battery electrode, are described herein.

The highly porous battery electrode includes a monolithic porous structure having a porosity in the range of from about 74% to about 99% and comprising a conductive material. An active material layer is disposed on the monolithic porous structure. The pores of the monolithic porous structure have a size in the range of from about 0.2 micron to about 10 microns. The active material is deposited on the monolithic porous structure as a film which may have a thickness of one-half or less the pore diameter. The reduced pore size, and thus reduced diffusion distances for ions and electrons, as compared to commercially available nickel foam current collectors, can markedly accelerate energy storage and release processes.

The method of making the battery electrode includes, according to one aspect, providing a scaffold of interconnected elements separated by voids, and depositing a conductive material through the voids and onto the interconnected elements of the scaffold. The scaffold is removed to obtain a monolithic porous structure comprising the conductive material and including pores defined by the interconnected elements of the scaffold. The monolithic porous structure may be etched after scaffold removal to further increase its porosity. The final porous structure has a pore volume fraction in the range of from about 74% to about 97% and a pore size in the range of from about 0.2 micron to about 10 microns. An electrochemically active material is deposited on the monolithic porous structure to form the battery electrode.

The method of making the battery electrode includes, according to another aspect, providing a scaffold of interconnected elements separated by voids, and depositing a conformal material through the voids and onto the interconnected elements of the scaffold. A conductive material is then deposited through the voids and onto the conformal material. The scaffold and the conformal material are removed to obtain a monolithic porous structure comprising the conductive material and including pores defined by the interconnected elements of the scaffold and the overlying conformal material. The monolithic porous structure has a porosity in the range of from about 74% to about 99% and a pore size in the range of from about 0.2 micron to about 5 microns. An electrochemically active material is deposited on the monolithic porous structure, thereby forming a battery electrode.

BRIEF DESCRIPTION OF THE DRAWINGS

FIGS. 1(a)-1(e). Schematics of an exemplary preparation procedure of a porous battery electrode, including formation of a template (FIG. 1(a)), deposition of a conductive material into voids of the template (FIG. 1(b)), removal of the template to obtain a monolithic porous structure (FIG. 1(c)), removal of a portion of the conductive material (e.g., by etching) of the monolithic porous structure to increase the porosity thereof (FIG. 1(d)), and deposition of an active material to form the porous battery electrode (FIG. 1(e)).

FIGS. 4(a)-4(b). Scanning electron microscope (SEM) images of an NiOOH electrode.

FIGS. 5(a)-5(d). Schematic illustrations of an exemplary process for preparing porous battery electrodes, including vertical deposition to form template of polystyrene opal (FIG. 5(a)), electrodeposition of conductive metal into voids of template (FIG. 5(b)), removal of template to yield monolithic porous structure (FIG. 5(c)), electropolishing of monolithic porous structure by high voltage pulses (FIG. 5(d)), and pulsed electrodeposition of NiOOH or MnOOH to form highly porous current collector (FIG. 5(e)).

DETAILED DESCRIPTION

Figure 2B:
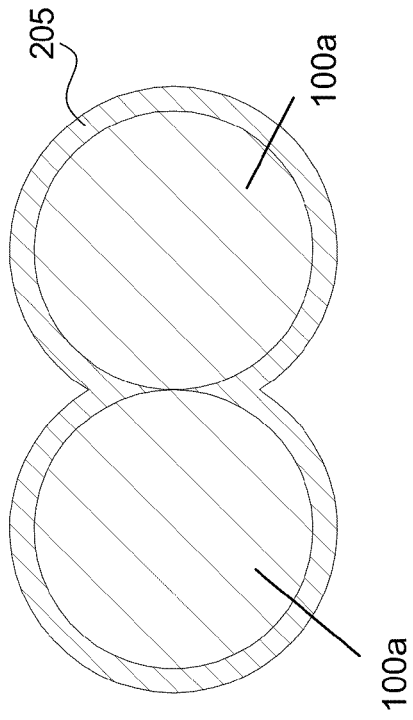
FIGS. 2(a)-2(d). Schematics of a chemical vapor deposition (CVD) or atomic layer deposition (ALD) process for enlarging interconnect "window size" between pores of a monolithic porous structure when chemical vapor deposition or atomic layer deposition, involving (FIG. 2(a)) formation of a template, (FIG. 2(b)) deposition of a conformal coating, (FIG. 2(c)) deposition of a conductive material layer, and (FIG. 2(d)) removal of the template and the conformal layer.

Template and non-template based methods have been explored to make three-dimensional (3D) monolithic porous structures from metals such as Au, Ag, W, Pt, Pd, Co, Ni and Zn. Generally, the colloid templating process is a route where a conductive material is filled into a preformed colloidal assembly or colloidal crystal followed by removal of the colloidal template, resulting in a conductive inverse opal structure. It may also be possible to assemble the colloidal particles and the conductive material at the same time. The conductive material is present in substantially all the spaces between colloidal particles. If the colloidal structure is ordered in a face centered cubic (FCC) lattice, the resulting inverse opal structure contains a FCC lattice of close packed spherical voids after removal of the colloid template.

The present method exploits electrochemical, gas, and/or solution phase approaches for fabricating inverse opal structures and other monolithic porous structures with control over sample thickness, surface topography, pore structure, two-dimensional and three-dimensional periodicity, the structural openness, and surface chemistry. These approaches enable porous battery electrodes with ultrafast discharge and charge capabilities to be fabricated.

Battery technologies may suffer from slow kinetics due to the long pathways for solid-state ion diffusion or electron transport in active materials. The porous battery electrodes described herein are designed to have reduced ion and electron transfer lengths without sacrificing storage capacity. Because the structural design does not limit the electrochemistry, the porous electrodes of the present disclosure may be used for nickel metal hydride, lithium ion, or other rechargeable battery systems. The capability of such porous electrodes of ultrafast energy storage and release is exemplified by assembling them into nickel-hydrogen and lithium ion batteries, as described further below.

The process of forming the porous electrodes of the present disclosure can be broken down into five main steps as shown in FIGS. 1(a)-1(e). Each step can be performed in a number of different ways and may employ different materials.

Referring to FIG. 1(a), a scaffold or template 100 of interconnected elements (e.g., packed particles) 100a separated by voids 100b is made by gravity sedimentation, vertical deposition, controlled drying, spin-coating, tape casting, or a related process. The exemplary polystyrene opal template 100 including interconnected particles 100a in FIG. 1(a) is fabricated by vertical deposition. The template 100 shown has a periodic structure, although periodicity is not a requirement. Ordered templates are important for many optical applications; however, periodicity is much less important for battery performance.

The second step is to grow or deposit a conductive material 110 through the voids 100b of the template 100 by a technique such as electrodeposition, chemical vapor deposition (CVD), atomic layer deposition (ALD), or sol-gel. The conductive material may be a metal or alloy, a compound with a high conductivity, and/or a composite including a conductive constituent. The composite structure 105 including the template 100 and the material 110 are shown in FIG. 1(*b*).

While the fabrication of the template 100 and the infilling of the voids 100*b* of the template with a conductive material 110 generally occur in separate steps, it is also envisioned that the template may be formed and the metal may be deposited concurrently, e.g., through the co-assembly of metal nanoparticles or metal precursors and the colloidal particles.

In the third step, the template 100 is removed, as shown in FIG. 1(*c*), to obtain the monolithic porous structure 115 comprising the conductive material 110. Generally speaking the conductive material 110 may include one or more of: nickel, tungsten, aluminum, copper, gold, platinum, silver, cobalt, chromium, titanium, iron, molybdenum, hafnium, $HfB_2$, $TiB_2$, nickel silicide, manganese silicide, titanium silicide, cobalt silicide, tungsten silicide, titanium nitride, and zirconium nitride.

Template removal can be accomplished by burn-out, chemical dissolution or a related method, depending on the template employed. The monolithic porous structure 115 in the fourth step is then in some cases electropolished or electrochemically etched to decrease the metal filling fraction (thereby increasing the porosity) and obtain an etched porous structure 115*a*, as indicated in FIG. 1(*d*). Selection of the template structure allows control over surface topography, pore structure, as well as two-dimensional and three-dimensional periodicity. Optionally, the monolithic porous structure material may be chemically modified after formation, or the surface of the monolithic porous structure may be coated with a different material.

Preferably, the porous structure has a porosity of from about 74% to about 99%, where porosity is defined as the volume fraction of pores and is expressed in terms of a percentage. A porosity ranging from about 74% to about 97%, from about 80% to about 97%, or from about 80% to about 95% may also be advantageous. In addition, the size (average lateral dimension) of the pores is preferably from about 0.2 micron to about 10 microns, from about 0.2 micron to about 5 microns, or from about 0.2 micron to about 2 microns, although larger or smaller sizes may be effective in some cases.

The last step is to form an electrode 120 for use in rechargeable batteries. A layer of an electrochemically active material 125 may be deposited into the monolithic porous structure 115 or the etched monolithic porous structure 115*a*, as shown schematically in FIG. 1(*e*). The high surface area active material layer 125 provides bulk-like storage capacity, while the thin metal interconnections 130 and small, interconnected voids or pores 135 of the underlying porous structure 115 or 115*a* ensure that ion and electron transfer path lengths are minimized.

Structure Control of Template and Monolithic Porous Structure

The structure control of electrodeposited metallic inverse opal has been described in a previous patent application (U.S. patent application Ser. No. 11/733,151). Particles can be made from inorganic materials like silica, borosilicate, titania, etc. or organic materials like polystyrene, polydivinylbenzene, poly(methyl methacrylate), etc and their copolymers. The surface of these particles can be chemically functionalized to be stable in certain solvents. Colloidal crystalline templates can be formed by controlled drying, microfluidic assisted packing, spin coating, sedimentation, etc. Non-crystalline form (colloidal glass) can be obtained through faster drying a colloidal solution, facilitate aggregation among spheres through higher temperature, higher ionic strength or mixture of opposite charged particles, etc.

The shape, size and location of voids throughout the monolithic porous structure will match the template. The template may be formed on a conductive substrate, which can act as an electrode during electrodepositing and electropolishing. In the event that alternative deposition methods are employed (CVD or sol-gel, for example), then a conductive substrate may not be necessary. The template may be any shape which can be formed on a surface. Preferably the template has close packed structure to minimize the fraction of metal scaffold for battery electrode application. The void fraction of the monolithic porous structure will in part depend on the size distribution of the particles, the shape of the particles, and the packing arrangement. For example, if the template particles all have exactly the same size and they are packed in a perfect close packed structure, the void fraction of the monolithic porous structure will be 0.74. Preferably, the template is formed of packed particles, more preferably packed particles in a three-dimensionally ordered structure, such as a cubic close packed structure, a hexagonal close packed structure, a primitive tetragonal packed structure or a body centered tetragonal structure, each of which will result in a monolithic porous structure having a void fraction after template removal, but before electropolishing, of 76%, 74%, 72% and 70%, respectively. The void fraction may be increased, for example, by adding second template particles, having a diameter small enough, and present in a small enough amount, to fit completely within the interstices of the lattice formed by the close packed larger template particles. Alternatively, the void fraction may be decreased, for example, by adding second template particles which are smaller than the closed packed template particles, but not small enough to fit within the interstices of the lattice. Preferably, the template particles will have a narrow size distribution, but mixtures of particles of different sizes are possible. If the template is formed of packed particles (i.e., they are in physical contact with each other), the monolithic porous structure formed will have interconnecting pores. The term "packed" means that the particles of the template material are in physical contact with each other.

Preferably, the particles have a particle diameter of 1 nm to 100 µm, more preferably from 40 nm to 10 µm, including 100 nm to 2 µm. This will result in a monolithic porous structure having a pore diameter which corresponds to the particle diameter (i.e. a pore diameter of 1 nm to 100 µm, more preferably from 40 nm to 10 µm, including 100 nm to 2 µm, respectively). The term "particle diameter" of a collection of particles means the average diameter of spheres, with each sphere having the same volume as the observed volume of each particle. A variety of particles are available commercially, or may be prepared as described in U.S. Pat. No. 6,669,961. The particles may be suspended in a solvent, such as water, an alcohol (such as ethanol or isopropanol), another organic solvent (such as hexane, tetrahydrofuran, or toluene), or mixtures thereof. If necessary, a surfactant may be added to aid in suspending the particles, and/or the mixture may be sonicated.

The particles of the template need not be spherical. For example, the particles may be elongated with an aspect ratio of 2:1 or higher, or 10:1 or higher. Aspect ratios as 20:1 or 50:1 may also be suitable for the particles. The particles may alternatively have some other three-dimensional shape, such as cubic, tetrahedral, octahedral, or pyramidal, or they may have an arbitrary, asymmetric morphology.

The template may contain any material which may either be dissolved or etched away, or a material which will decompose or evaporate during heating. A material which will at least partially decompose or evaporate during heating may be used, as long as any remaining material can be dissolved or etched away. Examples include polymers (such as polystyrene, polyethylene, polypropylene, polyvinylchloride, polyethylene oxide, copolymers thereof, and mixtures thereof, ceramic materials (such as silica, boron oxide, magnesium oxide and glass), elements (such as silicon, sulfur, and carbon), metals (such as tin, lead, gold, iron, nickel, and steel), and organic materials (such as pollen grains, cellulose, chitin, and saccharides).

Colloidal crystals are periodic structures typically formed from small particles suspended in solution. It is possible to form them by allowing slow sedimentation of substantially uniformly-sized particles in a liquid, such that the particles arrange themselves in a periodic manner. Other fabrication techniques are also possible. The average particle diameter of colloidal crystals ranges from 100 nm to 5 µm. It is possible to form colloidal crystals from any suitable materials.

The structure of colloidal crystals may exhibit two-dimensional periodicity or three-dimensional periodicity. Sedimentation of the colloidal particles induces a random stacking with the close-packed planes perpendicular to gravity. Such a randomly-stacked structure does not exhibit substantial three-dimensional periodicity, because of the randomness in the gravity direction. For some applications, it is desired to have materials exhibiting substantial three-dimensional periodicity. One way to do so is to use colloidal epitaxy to form the template crystal. Colloidal epitaxy involves growing a colloidal crystal normal to an underlying pattern, for example a series of holes, reflecting a particular three-dimensionally ordered crystal, such as the (100) plane of a face-centered cubic (FCC) crystal. The holes order the first layer of settling colloidal particles in a manner that controls the further sedimentation. Colloidal crystals which do not have an FCC structure have been fabricated by a variety of methods, including assembly of opposite charged particles, templated assistant colloidal crystal growth, DNA assisted colloidal self assembly, and colloidal self-assembly in an electric field.

Templates may also be formed by a direct writing method to create three-dimensional frameworks made of different materials. These frameworks can be used as the starting point for porous metals through at least two different procedures. In the first procedure, a framework can be formed on a conductive substrate such as gold or indium-tin oxide. The framework may then be directly used as a template, where the void space in the template is filled by electrodeposition or other methods. In the second procedure, the framework can be formed on a conductive substrate and then filled in with a second phase material such as $SiO_2$ or silicon. The initial structure can be removed, for example by calcination, and then the void space in the template may be filled by electrodeposition, CVD, ALD, sol-gel or the combination of several methods. After removal of the second phase material, a direct copy of the initial directly written structure is produced as the monolithic porous structure. Electropolishing or chemical etching could then be used to dramatically reduce the filling fraction to levels of a few percent or below. For example, the filling fraction may be reduced to about 5% or below, or to about 3% or below. A filling fraction of 1% or below may also be possible.

Electrodeposition, when employed for deposition of the conductive material into voids of the template, may be performed by any suitable electrochemical route. Generally, electrochemical techniques used to form thin films on conductive substrates (which serves as an electrode) will be suitable for forming the monolithic porous structure within the template. The electrodeposition provides a dense, uniform structure, because formation begins near the conductive substrate and moves up the template, with growth occurring substantially along a plane moving in a single direction normal to the substrate. The electrochemically grown structure is a three-dimensionally interconnected (monolithic) solid. The electrodeposition may be carried out from solution, or using ionic liquids.

The monolithic porous structure may thus contain any material suitable for electrodeposition. Elements, including metals, can be electrodeposited, for example Al, Si, Ti, V, Cr, Mn, Fe, Co, Ni, Cu, Zn, Ga, Ge, As, Se, Zr, Nb, Mo, Ru, Rh, Pd, Ag, Cd, In, Sn, Sb, Te, Hf, Ta, W, Re, Os, Ir, Pt, Au, Tl, Pb, and Bi. Alloys and compounds of these elements may also be electrodeposited. Semiconductors, such as CdS, CdSe, ZnO, $Cu_2O$, etc may also be electrodeposited. Once the monolithic porous structure is formed, the material it contains may be transformed by chemical reaction, for example a metal may be reacted with oxygen to form a monolithic porous structure containing the corresponding oxide, or reacted with sulfur (or $H_2S$) or a halogen to form a monolithic porous structure of the corresponding sulfide or halide. In addition, once formed the monolithic porous structure may be coated by atomic layer deposition, chemical vapor deposition, or anodization. For example, a monolithic porous structure may be coated with $Al_2O_3$, $HfO_2$, $ZrO_2$, $SiO_2$ and/or $TiO_2$, to a thickness of about 20 nm, using 200 cycles of atomic layer deposition or chemical vapor deposition process.

The electrode for the electrodeposition may be provided by any conductive substrate on which the template is formed, and which is compatible with the reagents of the specific electrodeposition. For example, it is possible to place a colloidal crystal template onto a conductive substrate, to form the crystal on a conductive substrate, or to deposit a conductive layer on one surface of the colloidal crystal. The electrode is preferably oriented so that the electrodeposition occurs along a plane moving in a single direction, in order to attain a desired density. Examples include metals, indium-tin oxide and gold-plated or platinum-plated glass, silicon or sapphire. The conductive substrate and template are typically selected so that the template adheres well to the substrate. It is also possible to treat the substrate and template to promote adhesion.

Aside from electrodepositing metal, chemical vapor deposition (CVD), sol-gel, atomic layer deposition (ALD), or another deposition technique may be used to coat or fill templates. Metals which can be deposited by CVD include, for example, Ni, W, Cu, Al, Pt, Au, Ag, Ti, Ni, Cr, Fe, Co, Mo, and Hf. Metal-organic compounds may be used as precursors for depositing a conductive layer through the templates. For example, $W(CO)_6$, $W(PF_3)_6$, $W(C_4H_6)_3$, $WF_6$, $WCl_6$, or $WBr_6$ may be used for tungsten (W) CVD; $Ni(CO)_6$ may be used for Ni CVD; $Cu(hexafluoroacetylacetone)_2$ may be used for Cu CVD; and triisobutylaluminum may be used for Al CVD. Compounds with high conductivity include, for example, $NiSi_2$, $MnSi_2$, $TiSi_2$, $CoSi_2$, $WSi_2$, $HfB_2$, $TiB_2$, TiN, and ZrN, and these can also be deposited into the template by CVD methods.

Once the deposition of conductive materials is completed, the resulting composite material is treated to remove the template. For example, in the case of an organic colloidal crystal, the composite may be heated to burn out the organics, for example at a temperature of at least 250° C. Other techniques are also possible, such as irradiation or plasma-assisted etching of the template. For inorganic templates, an etchant may be used to remove the template, for example by exposure of a silica template to HF. Polystyrene and other organic polymer templates are easily removed after formation of the monolithic porous structure by heating or dissolving with an organic solvent. Furthermore, a freestanding monolithic porous structure can be obtained by completely or partially etching away the substrate with proper etchant.

If the inverse structure is generated by a method which completely fills in the regions between the interconnecting elements of the template (e.g., the colloidal particles shown in FIG. 1(c)), it may have no more than about 74% porosity. The contact window between two adjacent spherical voids is so small that the further filling of electroactive materials is difficult. There are two methods to expand the window size and increase the porosity of the monolithic porous structure.

The first method is compatible with inverse structures obtained by electrodeposition or sol-gel processes. The sol-gel route comprises filling the template with sol precursors, removing the template, and chemically reducing an oxide or hydroxide to metal. Both electrodeposition and sol-gel fill substantially all the void space in the templates. After removal of the template, chemical etching, electropolishing (electrochemical etching), or anodization followed by chemical etching may be used to enlarge the window size and to increase the porosity of the monolithic porous structure.

For example, a monolithic porous structure formed from a close packed particle template may have a porosity of 74%; this can be increased to 75% or larger, for example 74-99%, including 80%, 82%, 85%, 90%, 95%, and 97% by electrochemical etching. Conversely, the filling fraction of the monolithic porous structure may be defined as the volume fraction of material surrounding the voids, where a porosity of 74% corresponds to a filling fraction of 26%, and a porosity of 75% or larger corresponds to a filling fraction of 25% or smaller. Similarly, porosities of 80%, 82%, 85%, 90%, 95%, and 97% correspond to filling fractions of 20%, 18%, 15%, 10%, 5%, and 3%, respectively. Since electropolishing is electrodeposition in reverse, most materials which can be electrodeposited can also be electropolished. Electropolishing provides uniform and controlled removal of the material of the monolithic porous structure.

Figure 2A:
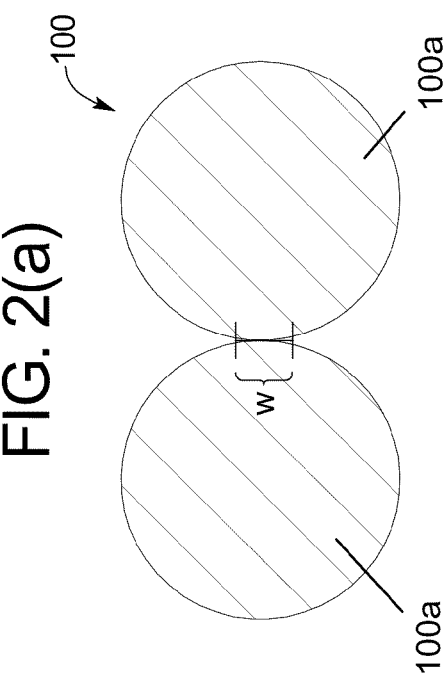
Figure 2D:
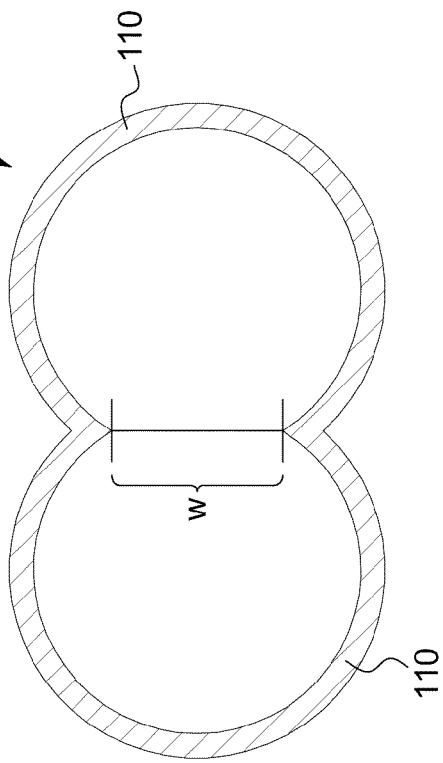
Figure 2C:
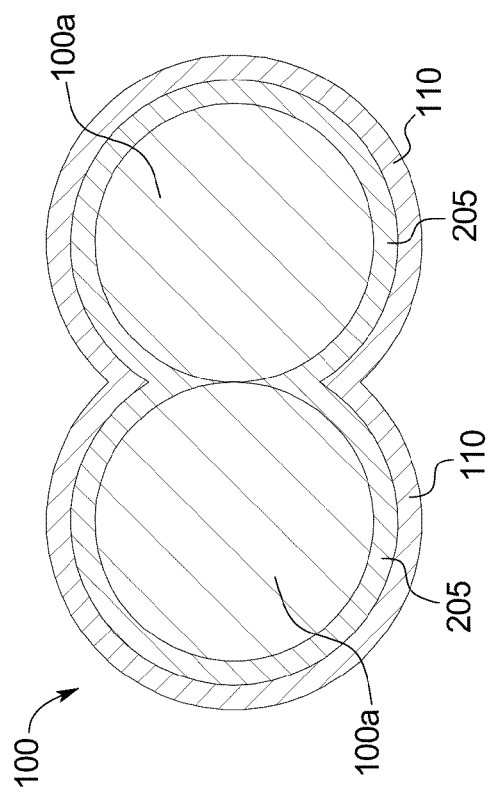

The second method is designed to enlarge window size and improve pore interconnectivity of monolithic porous structures made by CVD or ALD processes. Prior to depositing a conductive material into the voids of the template, which is shown schematically in FIG. 2(a), a conformal coating layer 205 is deposited by CVD or ALD (FIG. 2(b)) to increase the size of the interconnected elements 100a making up the template 100. In this example, the interconnected elements 100a are spherical particles, and their diameter is increased by the conformal coating layer 205. Preferably, the conformal coating layer 205 is made of a material that can be easily removed, such as $SiO_2$ or $Al_2O_3$. After depositing the conductive material (FIG. 2c), the template and coating layer may be removed, thereby enlarging the window size w (FIG. 2d). Using this method, the porosity of the porous structure may be as high as 99%.

Figure 3A:
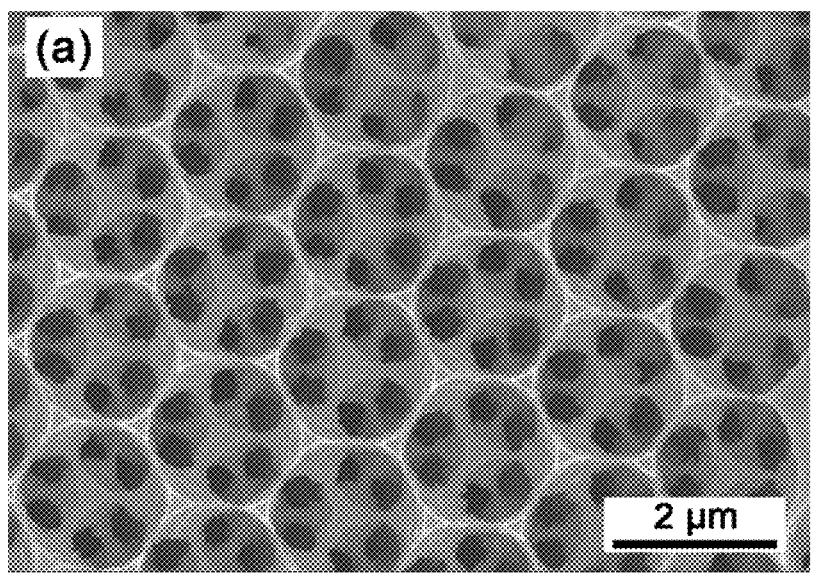
FIGS. 3(a)-3(b). Scanning electron microscope (SEM) image of a highly porous nickel structure obtained after etching (FIG. 3(a)), and theoretical porosity with respect to D/a, where D is a width or diameter of the voids in the porous nickel structure and a is a periodic spacing of the porous structure.
Figure 3B:
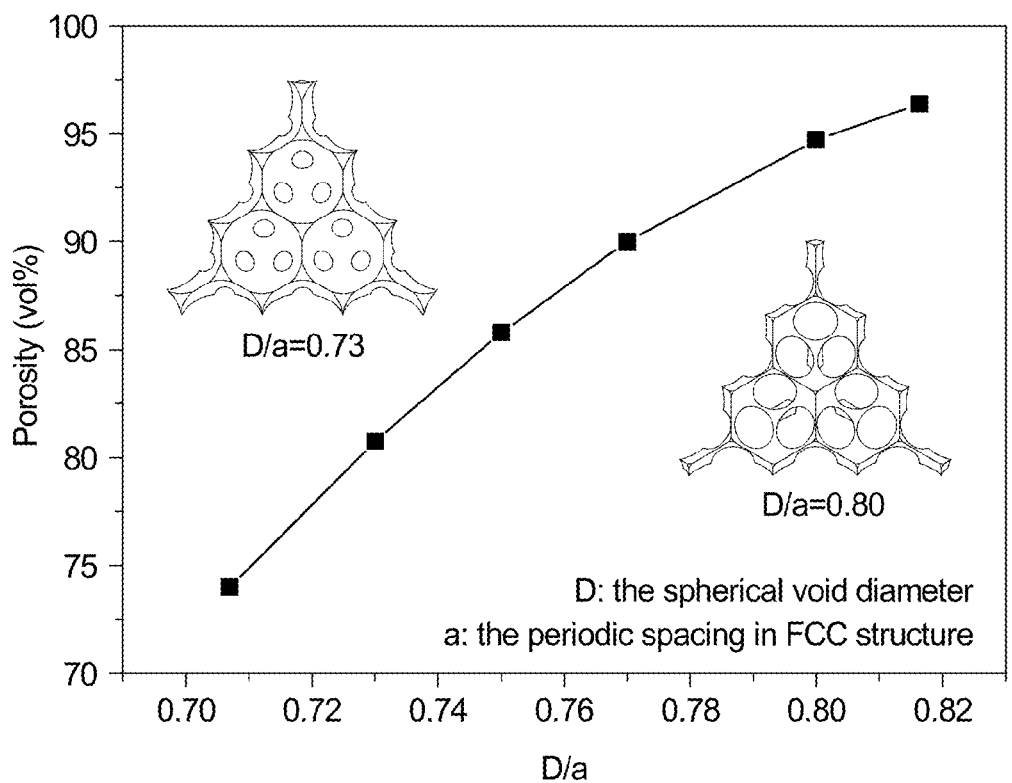

FIG. 3(a) is a scanning electron microscope (SEM) image of an etched porous structure 315a obtained by electrochemically etching a nickel inverse opal structure. The porosity of the sample shown in FIG. 3(a) is about 94%, and is adjustable in the range of from about 74% to about 96.4% regardless of the size of the template spheres used in the first step. FIG. 3(b) is a graph showing the theoretical relationship between the porosity of the etched porous structure and the ratio D/a, where D is the diameter of the substantially spherical voids formed by the polystyrene spheres of the opal template, and a is the periodic spacing of the face-centered cubic (FCC) structure of the opal template.

The porous conductive structure of the battery electrode may have a porosity in the range of from about 74% to about 97%, depending on the extent to which the porous structure is electropolished (if at all) prior to coating with the electrochemically active material. For example, the porosity may range from about 80% to about 97%, or from about 80% to about 95%. The electropolishing may be carried out as described above. The pores may be arranged in a periodic arrangement, such as a face centered cubic arrangement. The pores may be substantially spherical in shape, in which case the size of the pores is the diameter of the pores. The size of the pores may be substantially uniform across the across the porous conductive structure, varying by no more than a factor of about 10%. It is also possible, however, that the porous conductive structure of the battery electrode may include a bimodal or multimodal distribution of pores or non-spherical pores, depending on the template employed during fabrication of the structure, as discussed above.

In another embodiment, the monolithic porous structure may be coated with an electrochemically active material to form a battery electrode. For example, electrodeposition or another coating technology (e.g., sol-gel or CVD) may be employed to deposit a layer of NiOOH onto a monolithic porous conductive structure (e.g., a porous nickel structure) to fabricate a NiMH battery cathode. Similarly, a layer of MnOOH may be electrodeposited or otherwise coated onto the monolithic porous conductive structure and then lithiated to form a Li-ion battery cathode. FIGS. 4(a) and 4(b) show cross-sectional SEM images of a porous $Ni(OH)_2$ electrode 420. The porous nickel structure is substantially fully covered by nickel hydroxide 425. Both the current collector (porous conductive structure) of the electrode structure 420 and the active material 425 are bi-continuous (interconnected). Other suitable active materials may include, for example, cobalt oxide, lithium iron phosphate, vanadium oxides, or composite oxides for Li-ion cathode materials, and silicon, iron oxide, copper oxide, tin oxide, nickel phosphide, titanium oxide, nickel-tin alloy, copper-tin alloy for Li-ion anode materials.

For optimal charge transfer and fast energy storage and release, the porous conductive structure of the electrode generally includes pores of from about 0.2 micron to about 30 microns in size that are interconnected (or bi-continuous). It may be advantageous for the pores to range in size from about 0.2 micron to about 5 microns, or from about 0.2 micron to about 2 microns, as smaller pore sizes reduce electron and ion transfer paths. The porous conductive structure or framework of the battery electrode is also bicontinuous (interconnected). Ligaments of the porous conductive structure between the pores may have width ranging from 10 nm to 700 nm depending on the template employed, specific location in the monolithic metal structure and degree of electropolishing. Typically, the porous conductive structure includes nickel, copper, silver, gold, platinum, or alloys thereof, such as a nickel-cobalt alloy or a nickel-tungsten alloy. In the case of nickel-metal hydride battery electrodes, the active material is preferably nickel hydroxide, while lithium ion batteries may use lithiated manganese oxide as the active material. Typically, the active material is deposited to a thickness of between about 5 nm and about 2 microns by pulsed electrodeposition in a suitable solution. The pulses may range in duration from about 100 ms to 20 s, and the interval between pulses may range from about 0.5 s to about 200 s. The total number of pulses may control the thickness of the active material deposited on the porous conductive structure. In some cases, the active material is deposited to a thickness ranging from about 5 nm to about 350 nm. The maximum thickness depends on the window size and is generally about 28% of the size (e.g., the diameter D in FIG. 3(b)) of the elements (e.g., spheres) used in preparing the templates. The maximum thickness is also 50% or less than the pore size (e.g., diameter D in the case of spherical pores), and it may be 20% or less than the pore size, or 10% or less than the pore size. The active material can also be deposited by electrophoretic methods from particle containing solutions as long as the particles are small enough to fit through the porous network.

EXAMPLES

Electrochemical Properties (A) NiOOH Cathode for Nickel Metal Hydride Battery

1. Preparation of Monolithic Porous Nickel Structure (Nickel Inverse Opal): A substrate with 10 nm chromium and 100 nm gold on the clean silicon wafer is fabricated by electron-beam deposition. Polystyrene (PS) spheres with a diameter of 1.8 μm are used to prepare an opal structure by vertical deposition at 50° C., as shown schematically in FIG. 5(a). The obtained sample is annealed at 95° C. for 3 h in order to enhance the strength of contact between adjacent spheres. With platinum as a counter electrode, the PS opal sample is dipped into a nickel sulfate plating solution at room temperature. A constant cathodic current of about 1.2 mA/cm$^2$ is applied to reduce nickel ions into the void space of the polystyrene opal template, as shown schematically in FIG. 5(b). After electrodeposition, the sample is cleaned with deionized water and soaked in THF to remove the template, as shown in FIG. 5(c). The porous nickel structure (nickel inverse opal) obtained is electropolished using 6 V pulses with a 16 s interval, as depicted in FIG. 5(d). The porosity of the nickel inverse opal can be controlled by the number of potential pulses. Plating solution is obtained from Technic Inc and electropolishing solution is obtained from Electro Polish Systems, Inc.

2. Preparation of NiOOH cathode: Referring to FIG. 5(e), the active material of NiOOH is electrodeposited by potential pulses of 1.2 V (versus an Ag/AgCl reference electrode) in an aqueous solution of 0.13-1 M nickel sulfate, 0.13-1 M sodium acetate, and 0.1 M –1 sodium sulfate at a temperature of 25~45° C. The film thickness of NiOOH can be controlled by the number of potential pulses. The interval of 10 s between two pulses can be prolonged to allow ion diffusion in the three-dimensional opal structure. After deposition, the NiOOH electrode is rinsed with deionized water and dried at 100° C. for 10 h.

3. Electrochemical Characterization: The capacity of the NiOOH electrode may be determined by galvanostatic charge and discharge in a three-electrode cell with 1 M KOH aqueous solution (Princeton Applied Research, Model 263A). Platinum foil is used as the counter electrode. The electrochemical characterization reveals a capacity of 312 mA·h/g, which is near the theoretical value corresponding to more than one electron per nickel ion. The volumetric capacity is 389 mA·h/cm$^3$, including the nickel collector and active materials.

Figure 6:
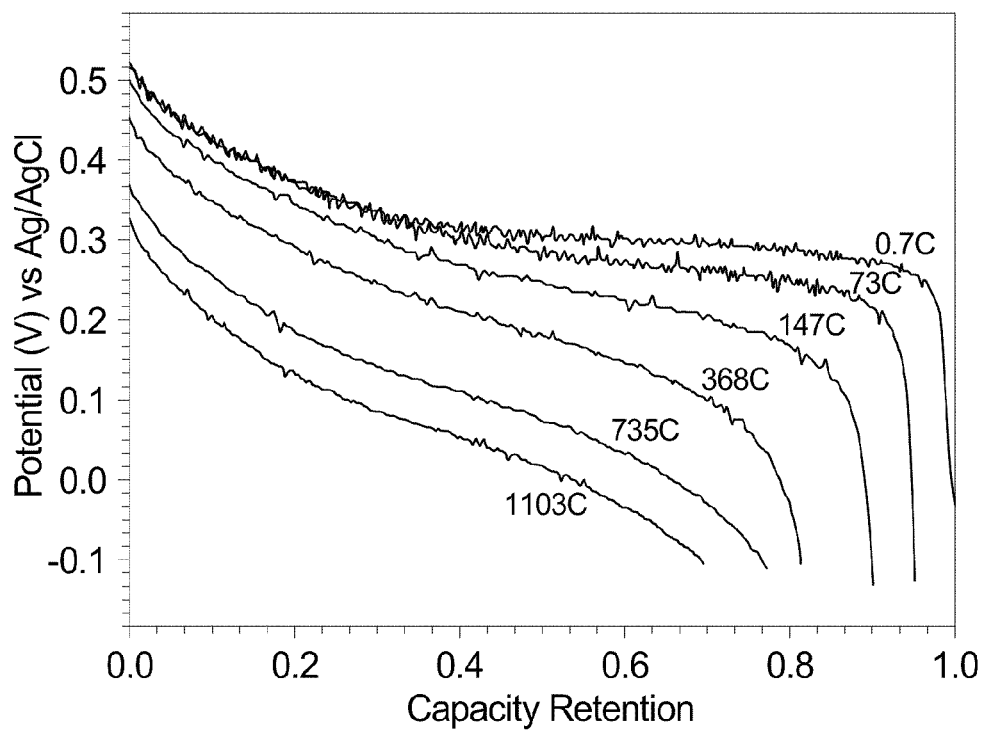
FIG. 6. Discharge curves for a NiOOH cathode at various C rates (versus Ag/AgCl reference electrode).
Figure 7:
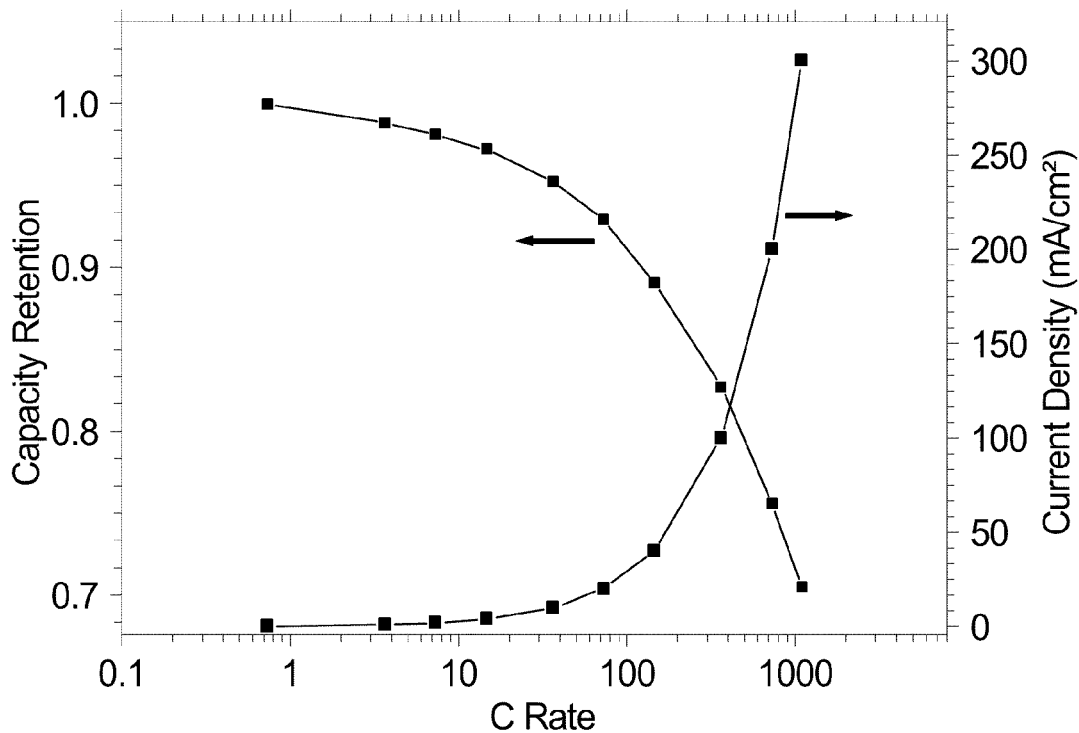
FIG. 7. Capacity retention as a function of C rate for the porous electrode of FIG. 6.
Figure 9A:
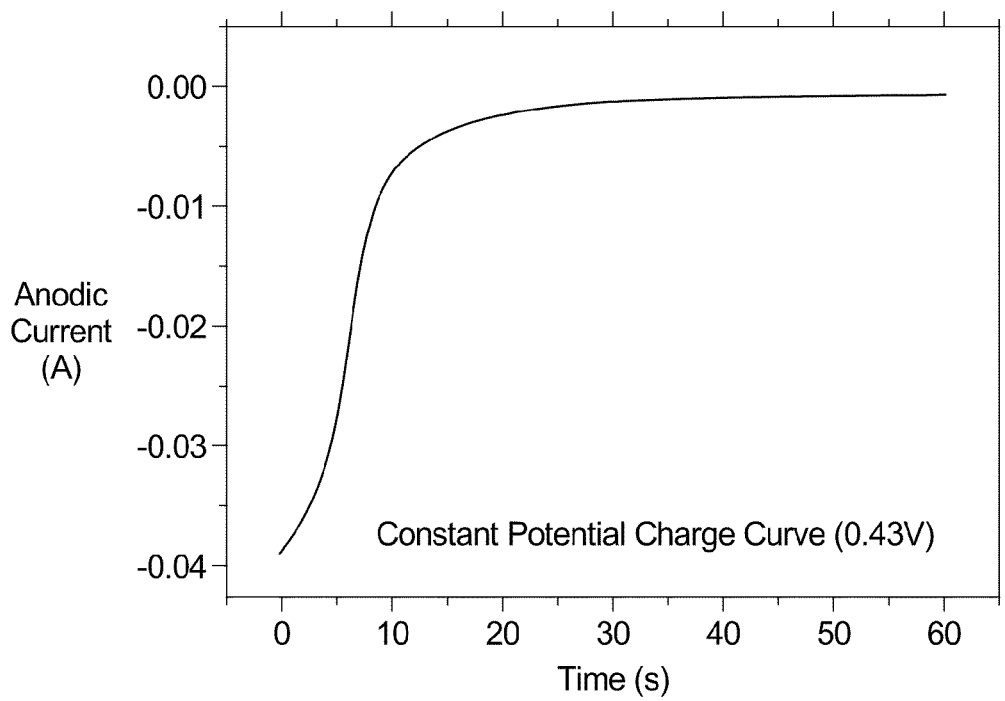
FIGS. 9(a)-9(d). Charge curve of NiOOH cathode under a constant potential of 0.43 V (vs Ag/AgCl reference electrode) (FIG. 9(a)). Discharge curve of NiOOH cathode after 10 s potentiostatic charge and comparison with the 1 C full charge (FIG. 9(b)). Charge curve of lithiated $MnO_2$ cathode under the constant potential of 3.6 V (vs $Li/Li^+$ reference electrode) (FIG. 9(c)). Discharge curve of lithiated $MnO_2$ cathode after 1 min and 2 min potentiostatic charge and comparison with the 1 C full charge (FIG. 9(d)).
Figure 9B:
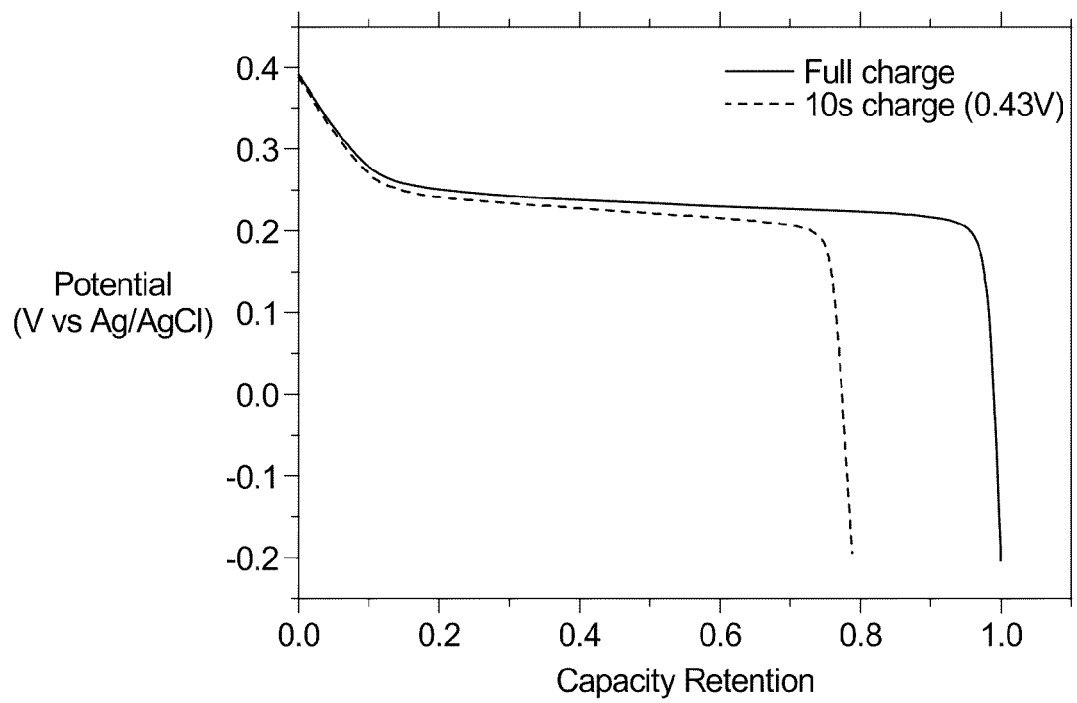

The discharge curves at various C rates are shown in FIG. 6. The porous electrode discharges like a perfect battery at <73 C rate. At higher discharge rates, the output potential drops because of the voltage loss inside of the electrode; however, it can still maintain 70% capacity at even as high as 1103 C rate. A 1 C rate means that all the capacity stored in the battery is delivered in 1 hour, and an 1103 C rate means that the battery can be completely discharged in 3.3 seconds. Capacity retention versus C rate is shown in FIG. 7. These are the results after 1000 charge and discharge cycles, which indicates that the porous electrode shows high performance and stability during ultrafast discharge. For comparison, a commercial NiMH battery maintains only 1-2% of its capacity at 35 C rate (as reported in *Electrochemical and Solid-State Letters,* 2007, 10(3) A56-A59). Due to the asymmetric characteristics of charge and discharge processes, rates suitable for recharge are generally much less than rates of discharge. High C rates result in overpotentials which exceed the maximum voltage, over which electrolyte is oxidized and bubble evolution severely impairs batteries. FIG. 9a shows the charge curve under constant maximum potential. Most of the capacity is delivered in the first 10 seconds. The electrode after 10 s charge can release as much as 78% of full energy which is charged at 1 C rate (as shown in FIG. 9b).

(B): Lithiated MnO$_2$ Cathode for Lithium Ion Battery

1. Preparation of Monolithic Porous Nickel Structure (Nickel Inverse Opal): The procedure is similar to that presented in the previous example.

2. Preparation of Lithiated Manganese Oxides: Manganese (II) sulfate and sodium acetate are dissolved to form 0.1~1 M Mn$^{2+}$ and 0.1~1 M Na$^+$ solution. Ethanol or methanol (~10 wt %) is added to improve the wettability of electrolyte solution in porous structure. A potential pulse of 0.7 V with an interval of 10 s, as show schematically in FIG. 5(e), is applied between the porous nickel structure (nickel inverse opal) formed in the first step and the platinum foil. A galvanostatic pulse may also be used for electrodeposition. The charge delivered by each galvanostatic pulse (current×time) is proportional to the thickness of the active materials deposited. The optimal thickness for each pulse is from about 0.5 nm to about 2 nm, which changes the concentration of ions inside each spherical void by less than 10%. The galvanostatic pulse current is ~5 A per cm$^3$ of the porous structure and the pulse time ranges from about 100 ms to about 5 s. The time interval between pulses is from about 5 s to about 20 s. When manganese oxyhydroxide is electrodeposited, the color of the sample turns brown. After washing and drying, the sample is dipped into a molten salt of lithium nitrate and lithium hydroxide (molar ratio 3:2) at 270° C. for 1 h. After lithiation, the residual salt on the sample is washed with excess water and dried at 100° C. for 10 h.

Figure 8:
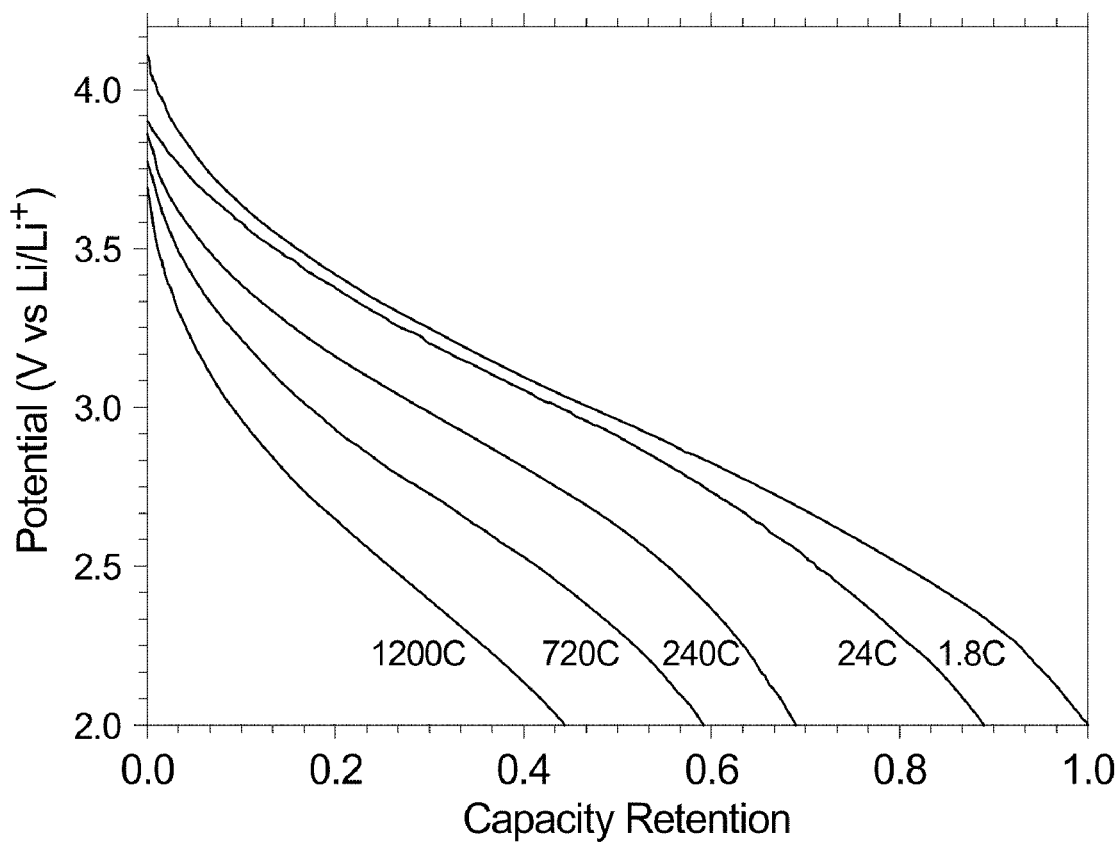
FIG. 8. Discharge curves for an exemplary porous lithiated $MnO_2$ cathode at various C rates (versus $Li/Li^+$ reference electrode).

3. Electrochemical Characterization: The electrolyte solution of 1 M LiClO$_4$ is prepared by dissolving lithium perchlorate into the mixture of dimethyl carbonate and ethylene carbonate (molar ratio 1:1). Lithium ribbon is used as the counter electrode. Galvanostatic charge and discharge behavior is determined by an electrochemical instrument (Princeton Applied Research, Model 263A). The discharge curves of lithiated MnO$_2$ electrode at various C rates are shown in FIG. 8.

Figure 9C:
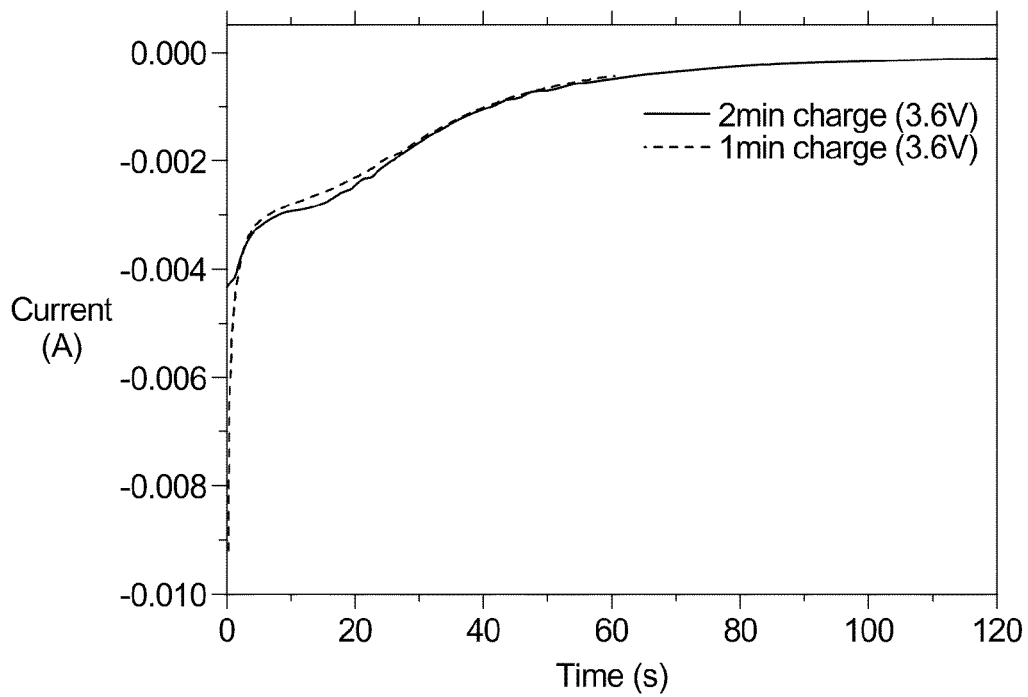
Figure 9D:
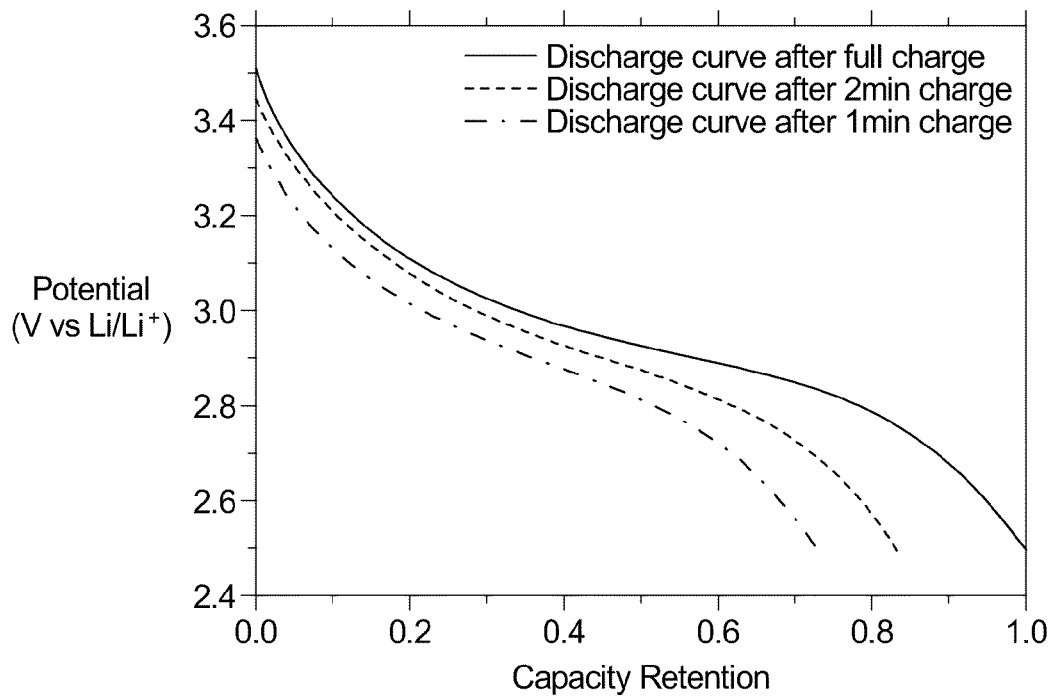

The HPCC described in the example of lithiated manganese oxide is derived from a colloidal crystal template of polystyrene spheres with a much smaller diameter (typically ~0.2 micron to ~0.6 micron) than the pore size of the example of NiOOH cathode. Lithium ion diffusivity in lithium host materials is smaller than proton diffusivity in NiOOH and thus a template with smaller characteristic dimensions may be beneficial as the template derived from small colloids can further reduce ion transport pass. The discharge curves at varied C rate are plotted in FIG. 8. These show that lithiated manganese oxide cathode with HPCC inside can release the energy stored in the electrode active materials very quickly. Up to 1200 C, it can maintain 42% of the capacity which can be delivered at 1.8 C. Fast charge capability is conducted by the constant potential method. The charge curve under the constant potential of 3.6V (vs Li/Li+ reference electrode) in FIG. 9(c) shows that the charge current decreases one order of magnitude in 1 min and most energy is stored during this period. Discharge curves in FIG. 9(d) confirms that 1 min charge can deliver 73% of the capacity which is compared to the 1 C galvanostatic charge. An additional minute of charging can increase the charged capacity to 83%.

(C) Nickel-Tin Alloy Anode within HPCC for Lithium Ion Battery

1. Preparation of Monolithic Porous Nickel Structure (Nickel Inverse Opal): The procedure is similar to that presented in the previous example.

2. Preparation of Nickel-Tin Alloy Anode: the electroplating solution is prepared containing 20 g/l $SnCl_2.2H_2O$, 15 g/l $NiCl_2.6H_2O$, 350 g/l $K_4P_2O_7.3H_2O$, 8 g/l potassium sodium tartrate ($C_4H_4O_6NaK.4H_2O$), and 8 g/l glycine. A galvanostatic pulse of 0.5 mA with 1 s on and 5 s off is applied to the deposited nickel-tin alloy. The thickness can be controlled by the number of pulses. The nickel-tin alloy has a large capacity; however, the lithium insertion increases the volume of anode materials and the delithiation causes significant volume shrinkage. This continuous cycling deteriorates the electric contact in the electrodes with a flat foil as current collector. The nickel HPCC can hold the nickel-tin active materials inside and accommodate the volume change. Therefore, the capacity fade can be alleviated.

(D) Silicon Anode within HPCC for Lithium Ion Battery

1. Preparation of Monolithic Porous Nickel Structure (Nickel Inverse Opal): The procedure is similar to that presented in the previous example.

2. Preparation of Silicon Anode: The nickel inverse opal is put into a glass tube. The vacuum of the tube is pulled down to ~$4 \times 10^{-6}$ bar. After filling with pure disilane, the tube is sealed and heated to 350° C. for 6 h. Amorphous silicon is deposited on the surface of the 3D porous metal structure.

To improve the silicon deposition and limit corrosion of the anode, a thin layer of tungsten may be deposited on the nickel inverse opal by thermo-decomposing $W(CO)_6$. The procedure is as follows: First, $W(CO)_6$ and nickel inverse opal are put into a tube or other container. The vacuum in the tube is pulled down to ~$4 \times 10^{-4}$ bar and hydrogen gas or forming gas (5% $H_2$ and 95% Ar) are filled to atmospheric pressure. The sealed tube is then heated to ~375° C. for 3 h.

Silicon as Li-ion anode material has a large capacity (up to 4000 mAh/g); however, it suffers from almost 300% volume change during charge/discharge cycles. The expansion and shrinkage of active materials may seriously impair the electric contact of the anode and cause the capacity fade. The nickel HPCC can hold the nickel tin active materials inside and accommodate the volume change. Therefore, the capacity fade can be alleviated.

EXAMPLES

Optical Properties and Thermal Emission

Figure 10A:
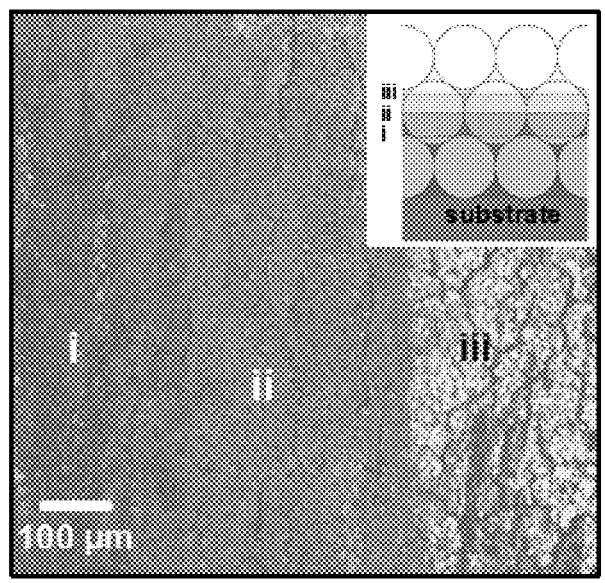
FIGS. 10(a), (b) (i)-(iii) and (c). Optical micrograph of electrodeposited nickel inverse opal showing different surface topographies. Inset: Nickel electrodeposition begins at the substrate and propagates upward; the three regions of different surface topographies are indicated by gray scale bands. (b)(i)-(iii) SEM images of the three different surface topographies observed in (a). (c) IR reflectance from the three regions of an electrodeposited nickel film.
Figure 10B:
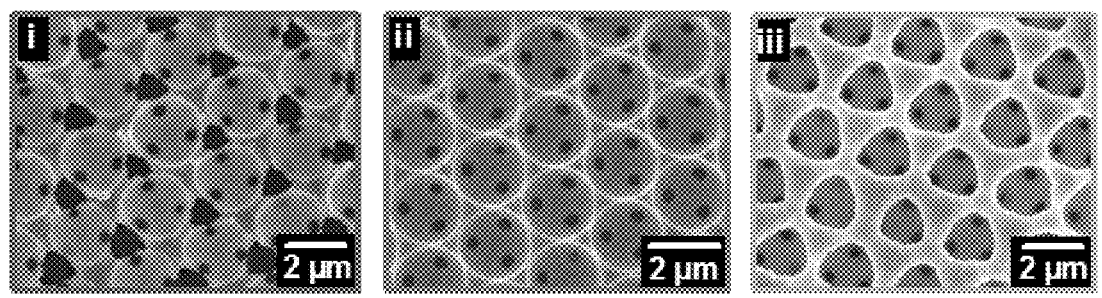

The optical properties and thermal emission of nickel inverse opals were first described in US2008/0246580, "Variably Porous Structures," which was filed on Apr. 9, 2007, and which is related to the present disclosure. Nickel was selected because of its high reflectivity in the infra-red, temperature stability, and ease of electrochemical processing. Nickel inverse opals were fabricated by electrodeposition through a polystyrene (PS) opal template which was first deposited on surface treated gold film evaporated on Si wafer. PS opals formed from microspheres ranging in diameter from 460 nm to 2.2 μm were used as templates; these examples focus on metal inverse opals formed using 2.2 μm microspheres. Templated electrodeposition was observed in all systems; this range of microsphere diameters is not an upper or lower limit. The final thickness of the sample was regulated by controlling the total charge. After electrodeposition, the PS microspheres were removed with tetrahydrofuran, resulting in a nickel inverse opal. Although the electrodeposition was quite homogeneous, gradual thickness variations may occur over the sample surface. These variations turn out to be useful, as they generate regions of different number of layers and surface terminations over the same sample (FIG. 10(a)). SEM reveals a direct correspondence between the color, green (i), red (ii) or yellow (iii), and the surface termination. As the color goes from green to red to yellow, the surface topography goes from shallow to deep bowl-like features, to deep cavities with openings at the top, as expected for electrodeposition through a layer of colloidal particles (FIG. 10b).

Figure 10C:
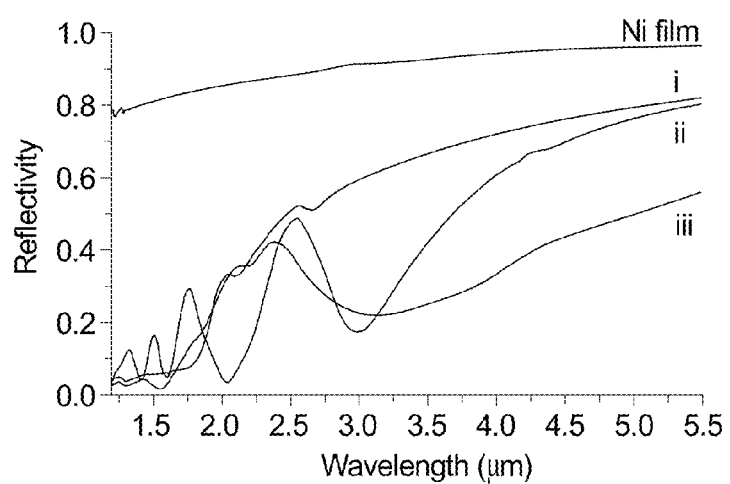

The reflectivity of a nickel inverse opal with varying surface termination was collected at normal incidence using an FTIR microscope (FIG. 10c). The three different surface terminations exhibited very different properties, and agreed qualitatively with previous observation on monolayer cavity structures. The data were consistent with a model where the optics are essentially due to a combination of Bragg plasmon and Mie plasmon interactions in the top layer of the structure. Light does not directly penetrate into the structure due to the small skin depth of nickel (~20 nm in near to mid IR) and the small size of the windows that connect the spherical cavities (SEM images in FIG. 10). Despite the fact that Bragg surface plasmon modes and TM Mie plasmon modes can have strong fields near the metal surface, which can result in propagation of light through a porous metal film, experimentally it was observed that plasmon based propagation of light into the structure was minimal. This was probably because the geometry of the top layer was different from that of interior layers, limiting the overall plasmon coupling efficiency.

To increase the penetration depth of light, and thus explore the effect of three-dimensional periodicity on the optical properties, the windows that interconnect the spherical cavities were enlarged. A preferred route rather was to homogeneously remove metal from the metal inverse opal by electroetching, a procedure commonly known as electropolishing, after removal of the colloidal template. Through control of the etching kinetics, the nickel inverse opals were uniformly etched through their entire thickness (FIG. 11(b)). The result of this etching can be structurally modeled as an increase in the diameter of the spherical cavities. The nickel filling fraction after etching was determined by SEM measurements.

Figure 11A:
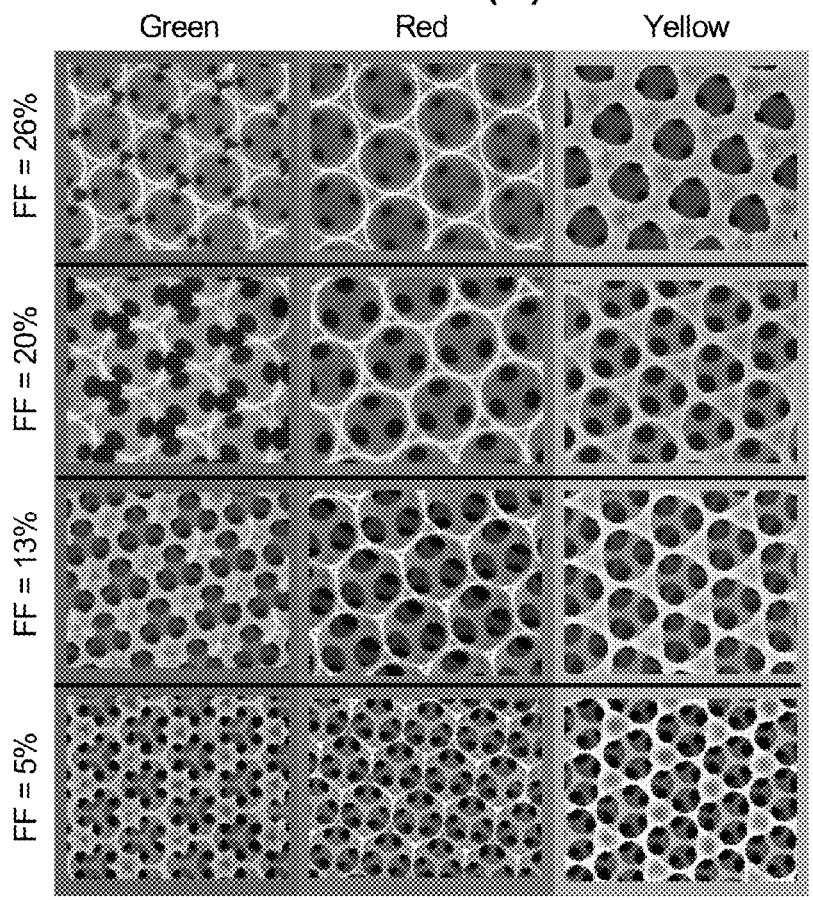
FIGS. 11(a)-(c). Increased structural openness by electropolishing: (a) Top view SEM images of nickel inverse opal of different surface topographies and structure openness. The four rows present nominal nickel filling fractions of 26% (as deposited), 20%, 13%, and 5%. The three columns correspond to the three different surface topographies described in FIG. 10. (b) SEM image of nickel inverse opal cross-section after etching (nickel filling fraction=13%). Etching is uniform throughout the thickness of the structure. (c) Reflectivity evolution as nickel filling fraction reduces. Spectra are from the green, red and yellow regions. For each color region, the traces correspond to a filling fraction of 26% (black), 20% (red), 13% (green), and 5% (blue); matching the SEM images in (a). All SEM images and reflective spectra are taken on the same 4 to 5 layer thick sample.
Figure 11B:
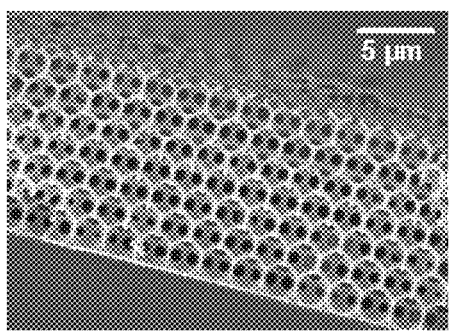
Figure 11C:
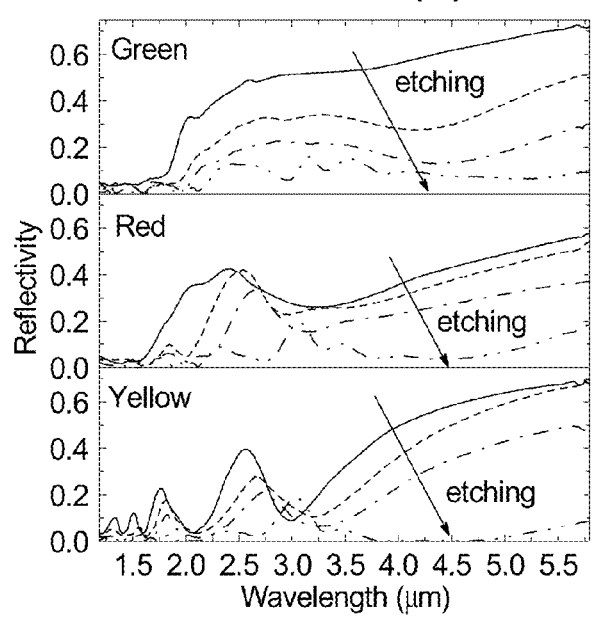

The optical properties as a function of structural openness were determined by successive electropolishing steps followed by measurements of optical properties. After each etching step, SEM images were collected to verify the amount of nickel removed. All spectra were collected from the same region of the sample. FIG. 11(a)-(c) present both the reflectivity evolution and SEM images of the three distinct surface topographies (three color areas) as the nickel volume fraction was reduced. The optical properties changed dramatically as the interconnections between voids become larger and the nickel filling fraction was reduced. As nickel was removed, the reflectivity generally decreased and the main features in the spectra shifted to longer wavelengths. The most dramatic change was that the reflectivity spectra of three different color areas, which initially were quite different, become fairly similar. Light now propagated deep into the structure and surface effects became much less important. The optical properties of the structure were now truly three-dimensional.

Figure 12:
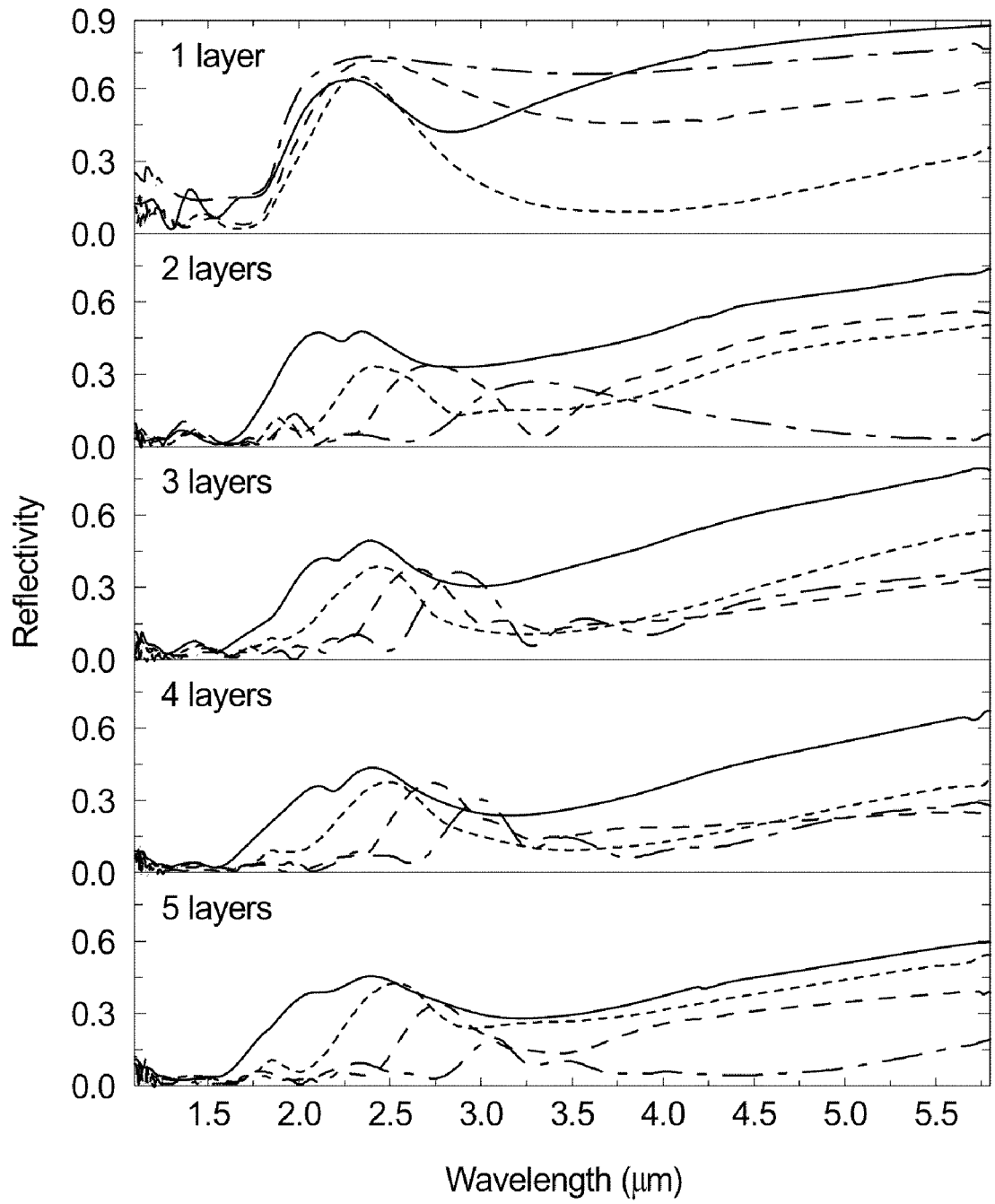
FIG. 12. Nickel inverse opal reflectivity as a function of thickness and filling fraction. Reflectance spectra collected from 1 to 5-layer thick samples terminated with the "red" topography. Within each set of spectra, the color scheme corresponds to the four different nickel filling fractions presented in FIG. 11.

To determine the penetration depth of light into the nickel inverse opal, the reflectivity as a function of the number of layers and metal filling fraction was measured from samples one to five layers thick (FIG. 12), each partially or completely formed layer was counted as one layer. Only the red color area was presented in FIG. 12, the other two color areas exhibited similar behavior. In each graph, the four curves correspond to the four levels of etching exhibited in FIG. 11($a$). Before etching, the spectra of all five samples were nearly identical, confirming that light was only interacting with the surface layer. As the structure opened up, spectra from samples of different thickness diverged. After the first etching step (red trace), the monolayer optical properties are different than the multilayer samples, but all multilayer samples are similar. By the final etching step (blue trace), the four and five layer samples were still similar, but the optical properties of the monolayer through three layer samples were different. Qualitatively, this data indicated that light substantially penetrated three to four layers into the fully etched samples (~5% nickel by volume). The limited penetration depth was further confirmed by the less than 1% transmission through a free standing six layer sample consisting of ~5% nickel by volume, over all investigated wavelengths.

Figure 13A:
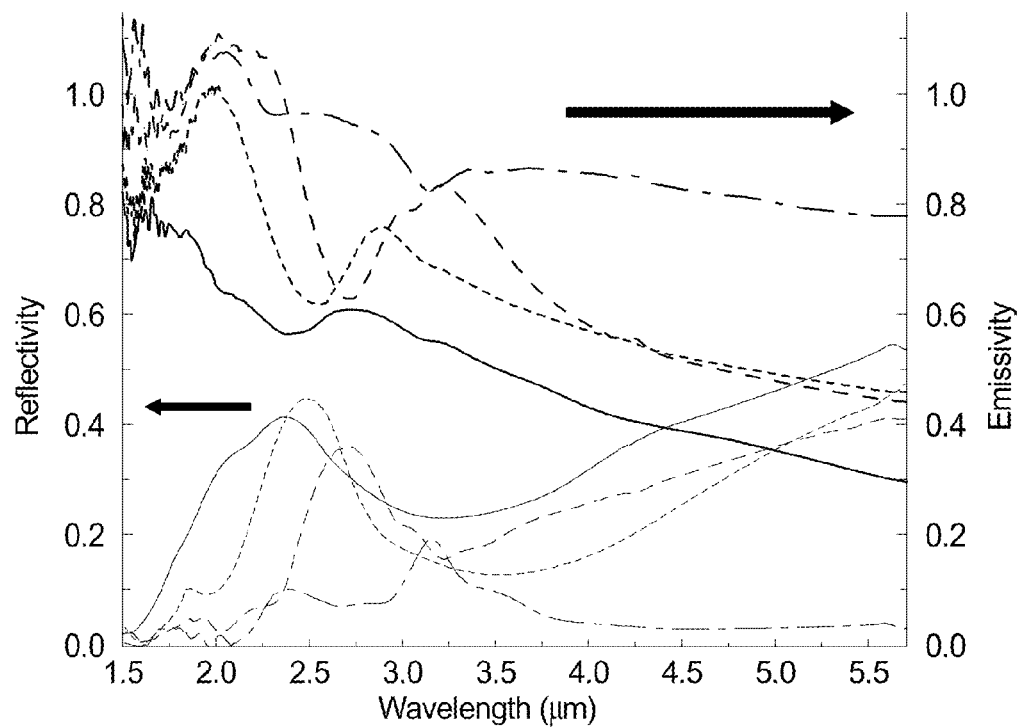
FIGS. 13(a) and 13(b). Emission and thermal stability of nickel inverse opal: (a) Reflectivity and emissivity measured from red (ii) topography area of nickel inverse opals are plotted together. Samples heated to ~450° C. for emission studies. Each pair of lines are taken from the same spot of a sample at the same filling fraction. Filling fractions correspond to those presented in FIG. 11. Thick lines (emissivity) closely match one minus the thin lines (reflectivity), as expected. (b) Top view SEM images of nickel inverse opal after heat treatment at various temperatures. The top row is an unprotected structure, the bottom row an $Al_2O_3$ protected nickel structure. Images are taken after holding the sample at the indicated temperature for one hour under a reductive atmosphere. All images are the same magnification except for the top right image, which is presented at a lower magnification as indicated to more clearly show the structural collapse.
Figure 13B:
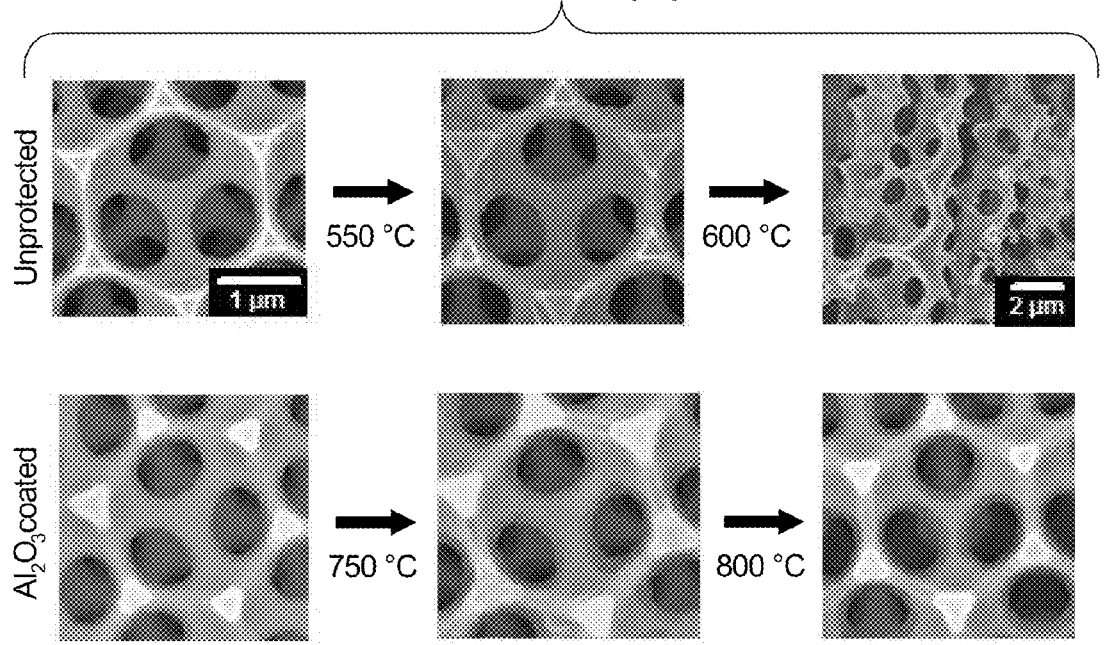
Figure 14:
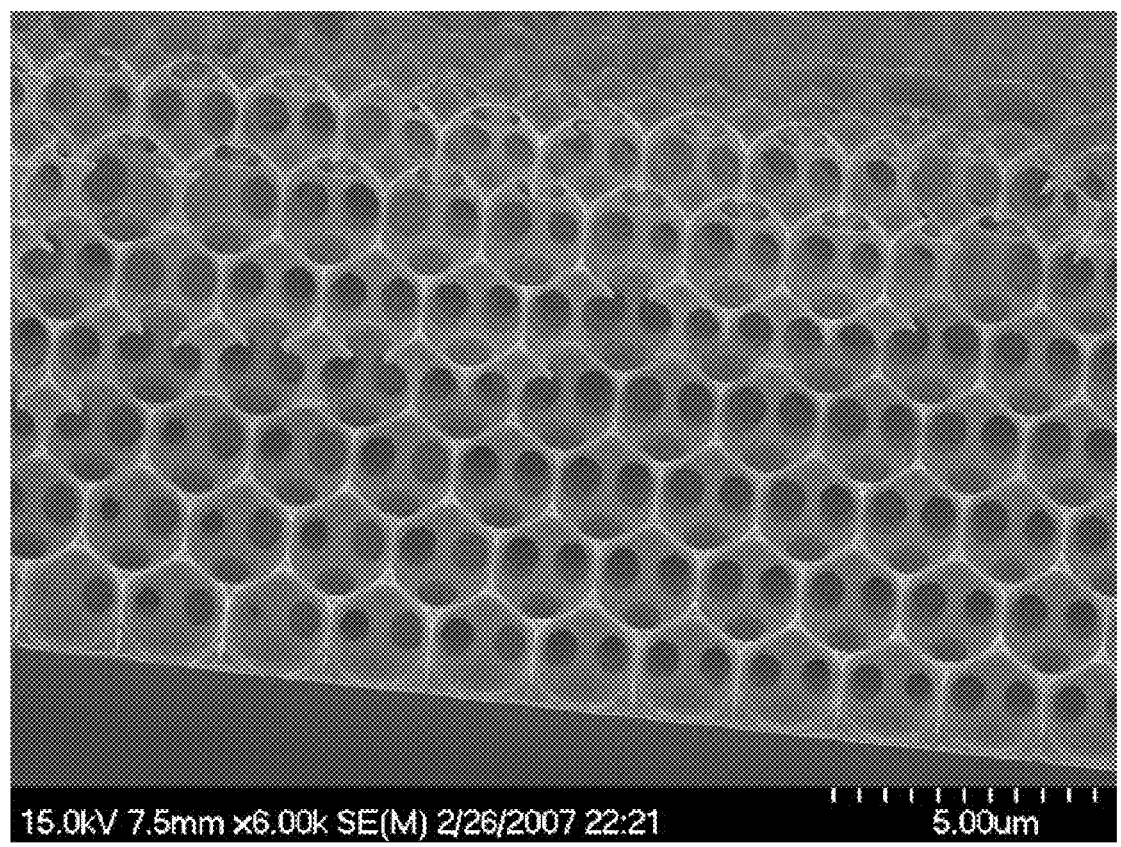
FIG. 14. SEM image of nickel inverse opal, after electropolishing.
Figure 15:
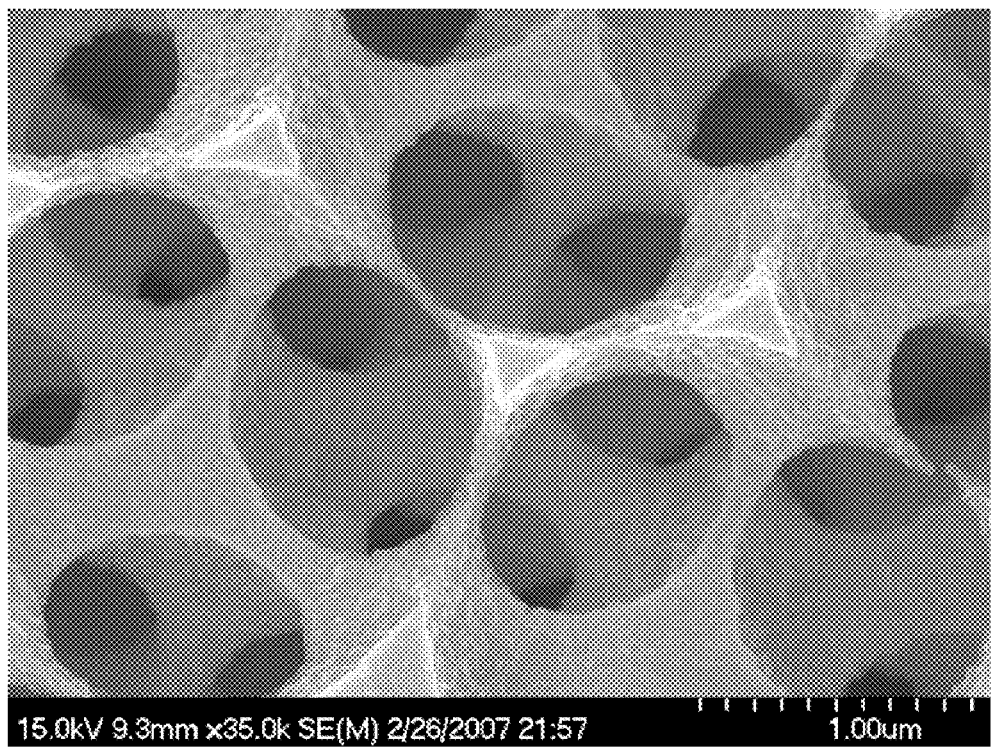
FIGS. 15 and 16. SEM images of nickel inverse opal, after electropolishing and thermal oxidation; at the thinnest regions, nickel has been completely oxidized.
Figure 16:
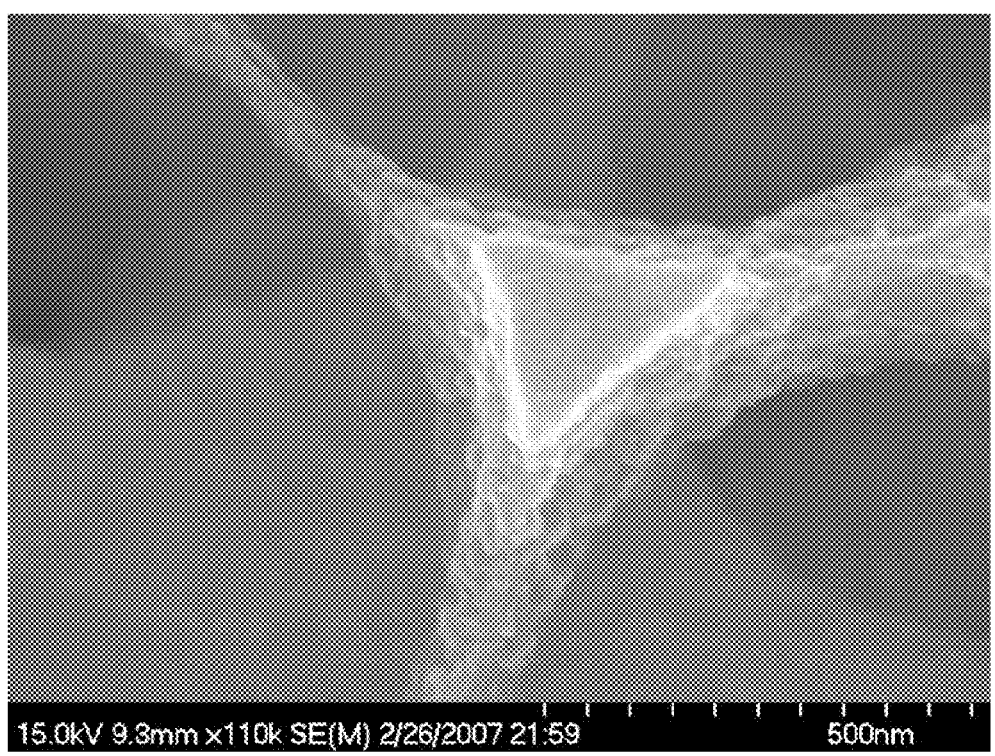

The thermal emission properties of metallic photonic crystals have been of considerable interest. Kirchoff's law states that emissivity ($\epsilon$) and absorptance ($\alpha$) of an object are equal for systems in thermal equilibrium. For the nickel inverse opals studied here, where transmission was negligible and Bragg scattering from the triangular pattern at the surface did not occur at wavelengths longer than ~1.9 µm for 2.2 µm spheres, in the sample normal direction, $\epsilon=\alpha=1-R$ with R being reflectivity. Emission measurements were performed by heating the nickel photonic crystal to ~450° C. in a reductive atmosphere (5% $H_2$ in Ar); the thermal emission was collected by the FTIR microscope. Emissivity was obtained by normalizing the emission from the Ni samples to that from the reference blackbody, a carbon black coated silicon wafer heated to the same temperature under Ar (FIG. 13($a$)). Emissivity from samples of different structural openness, ranging from 26% to 5% Ni by volume as before, was plotted together with reflectivity. Only data taken from the red color area are presented; data from other two color areas show similar effects. Spectra were grouped in pairs: each pair of the same color belongs to the same structure openness. Emissivity appears as a mirror image of reflectivity ($\epsilon=1-R$) even down to fine details for all wavelengths above 2 µm, confirming that the emission from the metal photonic crystal was modulated in a similar fashion as the reflectance. For wavelengths below 2 µm, the relationship disappears as Bragg scattered light was not collected, leading to an underestimation of the reflectivity. Emissivity in some cases slightly exceeded 1, almost certainly because the surface temperature of the nickel samples was slightly higher than that of the reference sample; a temperature difference of –5° C. is sufficient to explain this result. The emission of the carbon black sample was greater, and thus it was slightly cooler than the metal inverse opals, even though the temperature of the substrate heater was the same for both experiments.

A nickel inverse opal can be heated to ~550° C. without structural degradation. However, once heated to 600° C., it significantly collapses, even under a reductive atmosphere (FIG. 13($b$)). For thermal emission applications, it may be desirable for the metal structure to survive at higher temperature, for example, at 700° C., blackbody emission peaks near 3 µm. To protect the inverse opal structure, a 50 nm layer of $Al_2O_3$ was coated on the sample via atomic layer deposition. No change was observed in reflectivity or SEM images before and after the sample was held at 750° C. for one hour under reductive atmosphere, the same treatment at 800° C. results in only slight changes, indicating the $Al_2O_3$ layer increases the working temperature of the nickel structure by at least 200° C.

The substrate was prepared by evaporating ~30 nm of gold on a 700 µm thick silicon wafer using 1 nm of chromium as an adhesion layer. It was then soaked in a saturated 3-Mercapto-1-propanesulfonic acid, sodium salt (HS—($CH_2)_3$—$SO_3$Na) ethanol solution for 30 minutes forming a monolayer of hydrophilic molecules on the gold surface. 2.2 µm diameter sulfate terminated polystyrene spheres (Molecular Probes Inc.) were formed into an opal film on this substrate via evaporative deposition at 50° C. with a colloid volume concentration of 0.4% in water. Ni was electrodeposited using the electrodeposition solution Techni Nickel S (Technic Inc.) under constant current mode (1 mA/cm$^2$) in a two electrode setup with a platinum flag as the anode. Electropolishing was performed using the solution, EPS1250 (Electro Polish Systems Inc.) under constant voltage mode (4V) in a two electrode setup with a stainless steel plate as cathode. Polishing was performed with 1 second pulses on 10 second intervals. The interval was selected to allow ions to diffuse in and out of the inverse opal between etching pulses. Optical measurements were carried out on a Bruker vertex 70 FTIR coupled with a Hyperion 1000 microscope. A $CaF_2$ objective (2.4×, NA=0.07) was used for all measurements. A Linkam THMS600 heating chamber with a KBr window was used to heat the sample. Gas flow was regulated at 2 liters per minute in all measurements. The substrate heater was set at 500° C. for all emission experiments. Due to thermal resistance of the substrate, surface temperature of the substrate was about 50° C. lower than that of the substrate heater. Temperature survivability studies were performed in a tube furnace (Lindberg Blue M) under a flowing reductive atmosphere (5% $H_2$ in Ar).

These experiments demonstrate that high quality three dimensional monolithic porous structures can be made through a combination of colloidal crystal templated electrodeposition and electropolishing. Only after the structure is considerably opened up, allowing light to penetrate deep into the structure, do three-dimensional optical properties appear. Emission is indeed strongly modified by the porous structure. Because the experiments have probed nearly all possible degrees of structural openness and surface topographies, it is possible to determine the maximum possible modulation of the emission for an FCC inverse opal structure.

A highly porous current collector (HPCC) designed to have exceptionally short electron and ion transfer paths, and a method of making a HPCC-based battery electrode, have been described. Although the present invention has been described with reference to certain embodiments thereof, other embodiments are possible without departing from the present invention. The spirit and scope of the appended claims should not be limited, therefore, to the description of the preferred embodiments contained herein. All embodiments that come within the meaning of the claims, either literally or by equivalence, are intended to be embraced therein. Furthermore, the advantages described above are not necessarily the only advantages of the invention, and it is not necessarily expected that all of the described advantages will be achieved with every embodiment of the invention.

The invention claimed is:
1. A highly porous battery electrode for a rechargeable battery, the battery electrode comprising:
   a monolithic porous structure having a porosity in the range of from about 74% to about 99% and comprising a conductive material; and an active material layer on the monolithic porous structure, wherein pores of the monolithic porous structure have a size in the range of from about 0.2 micron to about 10 microns.

2. The battery electrode of claim 1, wherein the conductive material comprises at least one of nickel, tungsten, aluminum, copper, gold, platinum, silver, cobalt, chromium, titanium, iron, molybdenum, hafnium, $HfB_2$, $TiB_2$, nickel silicide, manganese silicide, titanium silicide, cobalt silicide, tungsten silicide, titanium nitride, and zirconium nitride.

3. The battery electrode of claim 1, wherein the porosity is in the range of from about 80% to about 99%.

4. The battery electrode of claim 1, wherein the pores of the monolithic porous structure are interconnected.

5. The battery electrode of claim 1, wherein the pores of the monolithic porous structure have an aperiodic arrangement.

6. The battery electrode of claim 1, wherein the pores of the monolithic porous structure have a periodic arrangement.

7. The battery electrode of claim 6, wherein the periodic arrangement is a face centered cubic structure.

8. The battery electrode of claim 7, wherein a D/a ratio of the monolithic porous structure is in the range of from about 0.71 to about 0.82, D being the size of the pores and a being a periodic spacing of the face centered cubic arrangement.

9. The battery electrode of claim 1, wherein the pores are substantially spherical in shape and the size of the pores is a diameter of the pores.

10. The battery electrode of claim 1, wherein the size of the pores varies across the monolithic porous structure by no more than a factor of 10%.

11. The battery electrode of claim 1, wherein the active material layer comprises at least one of NiOOH, lithiated $MnO_2$, Si, and a Ni—Sn alloy.

12. The battery electrode of claim 1, wherein the active material layer comprises a thickness of about 28% or less of the size of the pores.

13. The battery electrode of claim 12, wherein the active material layer comprises a thickness of about 10% or less of the size of the pores.

14. The battery electrode of claim 12, wherein the active material layer comprises a thickness of between about 5 nm and about 2 microns.

15. The battery electrode of claim 1, wherein ligaments of the monolithic porous structure between the pores have a width of between about 10 nm and about 700 nm.

16. A method of making a battery electrode, the method comprising:
providing a scaffold of interconnected elements separated by voids;
depositing a conductive material through the voids and onto the interconnected elements of the scaffold;
removing the scaffold to obtain a monolithic porous structure comprising the conductive material and including pores defined by the interconnected elements of the scaffold;
etching the monolithic porous structure to have a porosity in the range of from about 74% to about 97% and a pore size in the range of from about 0.2 micron to about 10 microns;
depositing an electrochemically active material on the monolithic porous structure, thereby forming a battery electrode.

17. The method of claim 16, wherein etching the monolithic porous structure comprises electrochemical etching.

18. The method of claim 16, wherein each of depositing the conductive material and depositing the electrochemically active material comprises sol-gel processing.

19. The method of claim 16, wherein each of depositing the conductive material and depositing the electrochemically active material comprises electrodeposition.

20. The method of claim 19, wherein electrodeposition of the electrochemically active material comprises immersion of the monolithic porous structure in a solution including at least one of nickel sulfate and manganese sulfate.

21. The method of claim 19, wherein electrodeposition of the electrochemically active material is carried out using one of galvanostatic pulses and potential pulses.

22. The method of claim 21, wherein electrodeposition of the electrochemically active material is carried out using potential pulses ranging from 0.7 volts to 1.2 volts.

23. The method of claim 22, wherein the potential pulses range in duration from about 100 ms to 20 s, and an interval between pulses ranges from about 0.5 s to about 200 s.

24. A method of making a battery electrode, the method comprising:
providing a scaffold of interconnected elements separated by voids;
depositing a conformal material through the voids onto the interconnected elements of the scaffold;
depositing a conductive material through the voids and onto the conformal material;
removing the scaffold and the conformal material to obtain a monolithic porous structure comprising the conductive material and including pores defined by the interconnected elements of the scaffold and the overlying conformal material, the monolithic porous structure having a porosity in the range of from about 74% to about 99% and a pore size in the range of from about 0.2 micron to about 10 microns;
depositing an electrochemically active material on the monolithic porous structure, thereby forming a battery electrode.

25. The method of claim 24, wherein the depositing of the conformal material, the conductive material, and the electrochemically active material comprise at least one of atomic layer deposition and chemical vapor deposition.

26. The method of claim 24, wherein the conformal material comprises one of $SiO_2$ and $Al_2O_3$.

* * * * *